United States Patent
Yang et al.

(10) Patent No.: US 11,829,902 B2
(45) Date of Patent: Nov. 28, 2023

(54) METHOD AND APPARATUS FOR DETERMINING OPERATING STATE OF PHOTOVOLTAIC ARRAY, DEVICE AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventors: Jinlin Yang, Shanghai (CN); Jing Chang, Shanghai (CN); Jie Sun, Shanghai (CN); Kang Jian, Shanghai (CN); Zhousheng Li, Shanghai (CN); Huirong Jiang, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

(*) Notice: Subject to any disclaimer, the term of this patent is extended or adjusted under 35 U.S.C. 154(b) by 0 days.

(21) Appl. No.: 17/910,941

(22) PCT Filed: Mar. 11, 2021

(86) PCT No.: PCT/SG2021/050125
§ 371 (c)(1),
(2) Date: Sep. 12, 2022

(87) PCT Pub. No.: WO2021/183053
PCT Pub. Date: Sep. 16, 2021

(65) Prior Publication Data
US 2023/0142138 A1    May 11, 2023

(30) Foreign Application Priority Data
Mar. 13, 2020   (CN) .......................... 202010177887.7

(51) Int. Cl.
G06Q 50/06    (2012.01)
H02S 50/10    (2014.01)
G06N 5/02     (2023.01)

(52) U.S. Cl.
CPC .............. G06Q 50/06 (2013.01); G06N 5/02 (2013.01); H02S 50/10 (2014.12)

(58) Field of Classification Search
CPC .................................. H02S 50/10; G06N 5/02
See application file for complete search history.

(56) References Cited

U.S. PATENT DOCUMENTS

| | | | |
|---|---|---|---|
| 9,209,743 B2 | 12/2015 | Hasegawa et al. | |
| 2012/0323507 A1* | 12/2012 | Hasegawa | H02S 50/10 702/59 |

(Continued)

FOREIGN PATENT DOCUMENTS

| | | |
|---|---|---|
| CN | 107451600 A | 12/2017 |
| CN | 108062571 A | 5/2018 |

(Continued)

OTHER PUBLICATIONS

Chen et al., Random forest based intelligent fault diagnosis for PV arrays using array voltage and string currents, Energy Conversion and Management, 2018, 178, pp. 260-264 (Year:2018) (Year: 2018).*

(Continued)

*Primary Examiner* — Arleen M Vazquez
*Assistant Examiner* — Lyudmila Zaykova-Feldman
(74) *Attorney, Agent, or Firm* — Crowell & Moring LLP; John C. Freeman

(57) ABSTRACT

A method including: acquiring present output current values of photovoltaic strings included in a photovoltaic array that, wherein includes at least two photovoltaic strings in parallel; determining a target abnormality score predicting model based on the present output current values. Determining a (Continued)

present abnormality score corresponding to the photovoltaic array by inputting the present output current values into the target abnormality score predicting model; and determining the operating state of the photovoltaic array by comparing the present abnormality score with a target abnormality score. The present abnormality score is output by inputting the present output current values acquired in real-time into the abnormality score predicting model, so as to determine the operating state of the photovoltaic array.

22 Claims, 9 Drawing Sheets

(56) References Cited

U.S. PATENT DOCUMENTS

| | | | | |
|---|---|---|---|---|
| 2013/0307556 | A1* | 11/2013 | Ledenev | H02S 50/10 |
| | | | | 324/509 |
| 2015/0127595 | A1* | 5/2015 | Hawkins, II | G06N 7/01 |
| | | | | 706/46 |
| 2015/0188415 | A1* | 7/2015 | Abido | G06N 3/043 |
| | | | | 307/103 |
| 2015/0248510 | A1* | 9/2015 | Meagher | G06Q 50/00 |
| | | | | 703/18 |
| 2016/0372929 | A1* | 12/2016 | Ishikawa | H02J 3/38 |
| 2019/0197203 | A1* | 6/2019 | Catthoor | H02J 3/38 |
| 2019/0386611 | A1* | 12/2019 | Tao | H02S 50/10 |
| 2020/0090070 | A1* | 3/2020 | Bhattacharyya | G06N 7/023 |
| 2021/0232106 | A1* | 7/2021 | Wen | G05B 13/047 |
| 2022/0206056 | A1* | 6/2022 | Cheng | H02H 1/0015 |

FOREIGN PATENT DOCUMENTS

| | | | | |
|---|---|---|---|---|
| CN | 108964606 | A * | 12/2018 | H02S 50/00 |
| CN | 109977624 | A | 7/2019 | |
| CN | 110460305 | A * | 11/2019 | H02S 50/10 |
| CN | 108964606 | B | 12/2019 | |
| CN | 110705727 | A | 1/2020 | |
| CN | 110763958 | A | 2/2020 | |
| JP | 2011-181614 | A | 9/2011 | |
| JP | 2020-025452 | A | 2/2020 | |
| WO | WO 2019/130718 | A1 | 7/2019 | |

OTHER PUBLICATIONS

Chang et al., Photovoltaic system heat spot fault detection method, CN1089064606, 2018, English translation downloaded from Espacenet on Apr. 3, 2023. (Year:2018) (Year: 2018).*

Wang, Photovoltaic array fault detection method and device, readable medium and electronic device, CN110460305A, English translation downloaded from Espacenet on Apr. 8, 2023. (Year:2019) (Year: 2019).*
Chen et al., Random forest based intelligent fault diagnosis for PV arrays using array voltage and string currents, Energy Conversion and Management, 2018, 178, pp. 260-264 (Year: 2018).*
Chang et al., Photovoltaic system heat spot fault detection method, CN1089064606, 2018, English translation downloaded from Espacenet on Apr. 3, 2023. (Year: 2018).*
Wang, Photovoltaic array fault detection method and device, readable medium and electronic device, CN110460305A, English translation downloaded from Espacenet on Apr. 8, 2023. (Year: 2019).*
Chen et al., Random forest based intelligent fault diagnosis for PV arrays using array voltage and string currents, Energy Conversion and Management, 2018, 178, pp. 260-264 (Year:2018) (Year: 2018) (Year: 2018).*
Chang et al., Photovoltaic system heat spot fault detection method, CN108964606A, 2018, English translation downloaded from Espacenet on Apr. 3, 2023. (Year:2018) (Year: 2018) (Year: 2018).*
Wang, Photovoltaic array fault detection method and device, readable medium and electronic device, CN110460305A, English translation downloaded from Espacenet on Apr. 8, 2023. (Year:2019) (Year: 2019) (Year: 2019).*
International Search Report dated Jun. 18, 2021 (3 pages) from PCT Priority Application PCT/SG2021/050125.
Written Opinion of the International Searching Authority dated Jun. 18, 2021 (4 pages) from PCT Priority Application PCT/SG2021/050125.
International Preliminary Report on Patentability dated Mar. 3, 2022 (25 pages) from PCT Priority Application PCT/SG2021/050125.
Chen Z., et al., "Random forest based intelligent fault diagnosis for PV arrays using array voltage and string currents", Energy Conversion and Management, vol. 178, Dec. 15, 2018, pp. 250-264.
Notification of Reasons for Refusal (8 pages including English machine translation) dated Feb. 10, 2023 out of corresponding JP Application No. 2022-554929.
Notice of Decision to Grant Registration (6 pages including English translation) dated Mar. 21, 2023 issued by the Korean Intellectual Property Office for the corresponding Korean Patent Application No. 10-2022-7035600; Korean Patent Application No. 10-2022-7035600; dated Mar. 21, 2023 Allowed Claims (5 pages).
Substantive Examination Adverse Report dated Mar. 29, 2023 (3 pages) issued by the Intellectual Property Corporation of Malaysia for the corresponding Malaysian patent application No. PI2022004867.
Examination Report No. 1 dated May 4, 2023 (3 pages) issued by the IP Australia for corresponding Australian patent application No. 2021234844.
Decision to Grant a Patent (5 pages including English translation) dated Jun. 22, 2023 out of corresponding JP Application No. 2022-554929.
Extended European Search Report (9 pages) dated Jul. 21, 2023 out of corresponding European patent application No. 21768062.8.

* cited by examiner

METHOD AND APPARATUS FOR DETERMINING OPERATING STATE OF PHOTOVOLTAIC ARRAY, DEVICE AND STORAGE MEDIUM

This application is a national application based on Patent Cooperation Treaty Patent Application No. PCT/SG2021/050125, filed on Mar. 11, 2021, the entire contents of which are incorporated herein by reference.

This application claims under 35 U.S.C. § 119(a) the benefit of the filing date of Chinese Patent Application No. 202010177887.2, filed on Mar. 13, 2020, the entire contents of which are incorporated herein by reference.

BACKGROUND OF THE INVENTION

Field of Invention

Embodiments of the present disclosure relate to the field of photovoltaic technologies, and in particular relate to a method and an apparatus for determining an operating state of a photovoltaic array, a device and a storage medium.

DESCRIPTION OF RELATED ART

An output current of a photovoltaic module may be reduced during actual operation of a photovoltaic station due to problems such as partial shade shielding, serious dust accumulation in some areas, or failure of some photovoltaic assemblies, which may cause a significant mismatch of an output current of a photovoltaic string, and thus bringing power generation loss to the photovoltaic station.

In the related art, the temperature of the photovoltaic module may be too high or too low due to a failure of a photovoltaic module, such that a color of the failed photovoltaic module in an infrared image is different from those of other normal photovoltaic assemblies. Therefore, images of the photovoltaic assemblies may be acquired with an infrared image acquisition device equipped on a drone, and the operating state of a photovoltaic module in a photovoltaic array may be determined based on the acquired infrared images.

However, the acquired infrared images can be easily affected by environmental factors of the station, such as the ambient temperature of the station, such that the discrimination between the failed photovoltaic module and the normal photovoltaic module in the infrared image is low, and thus the accuracy of determining the operating state of the photovoltaic array is low.

SUMMARY

Embodiments of the present disclosure provide a method and an apparatus for determining an operating state of a photovoltaic array, a device and a storage medium.

In a first aspect, a method for determining an operating state of a photovoltaic array is provided by an embodiment of the present disclosure. The method includes:

acquiring present output current values of photovoltaic strings included in a photovoltaic array, wherein the photovoltaic array includes at least two photovoltaic strings in parallel;

determining a target abnormality score predicting model based on the present output current values, wherein different abnormality score predicting models correspond to different characteristic current value ranges, and the abnormality score predicting model is obtained by training based on a historical output current value of the photovoltaic array;

determining a present abnormality score corresponding to the photovoltaic array by inputting the present output current values into the target abnormality score predicting model; and determining an operating state of the photovoltaic array by comparing the present abnormality score with a target abnormality score, wherein different abnormality score predicting models correspond to different abnormality scores, and the abnormality score is obtained after inputting the historical output current value into the abnormality score predicting model.

In a second aspect, an apparatus for determining an operating state of a photovoltaic array is provided by an embodiment of the present disclosure. The apparatus includes:

a first acquiring module, configured to acquire present output current values of photovoltaic strings included in a photovoltaic array, wherein the photovoltaic array includes at least two photovoltaic strings in parallel;

a first determining module, configured to determine a target abnormality score predicting model based on the present output current values, wherein different abnormality score predicting models correspond to different characteristic current value ranges, and the abnormality score predicting model is obtained by training based on a historical output current value of the photovoltaic array;

a second determining module, configured to determine a present abnormality score corresponding to the photovoltaic array by inputting the present output current values into the target abnormality score predicting model; and a third determining module, configured to determine an operating state of the photovoltaic array by comparing the present abnormality score with a target abnormality score, wherein different abnormality score predicting models correspond to different abnormality scores, and the abnormality score is obtained after inputting the historical output current value into the abnormality score predicting model.

In a third aspect, a computer device including a processor and a memory is provided by an embodiment of the present disclosure. The memory stores at least one instruction, at least one program, a code set or an instruction set therein. The at least one instruction, the at least one program, the code set or the instruction set, when loaded and executed by the processor, causes the processor to perform the method for determining the operating state of the photovoltaic array according to the above aspects.

In a fourth aspect, a computer-readable storage medium is provided by an embodiment of the present disclosure. The computer-readable storage medium stores at least one instruction, at least one program, a code set or an instruction set therein. The at least one instruction, the at least one program, the code set or the instruction set, when loaded and executed by a processor, causes the processor to perform the method for determining the operating state of the photovoltaic array according to the above aspects.

The technical solution according to the embodiments of the present disclosure may achieve at least the following beneficial effects.

Present output current values of photovoltaic strings included in a photovoltaic array are acquired, a target abnormality score predicting model is determined based on the present output current values, a present abnormality score corresponding to the photovoltaic array is output by inputting the present output current values into the target abnormality score predicting model, so as to compare the present abnormality score with a target abnormality score corresponding to the target abnormality score predicting model, and thus an operating state of the photovoltaic array is determined based on the comparison result. The present abnormality score is output by inputting the present output current values acquired in real-time into the abnormality score predicting model, so as to determine the present operating state of the photovoltaic array. Since the present output current value can reflect the operating state of the photovoltaic array in real-time, compared to a method for determining an operating state through an infrared image in the related arts, the interference of the ambient temperature on the infrared image can be avoided, thereby improving the accuracy of determining the operating state of the photovoltaic array.

DETAILED DESCRIPTION

In order to make the objectives, technical solutions, and advantages of the present disclosure clearer, the implementations of the present disclosure will be further described in detail below in combination with the accompanying drawings.

The term "a plurality of" mentioned herein means two or more, and the term "and/or" describes an association relationship of associated objects, indicating that there may be three types of relationships. For example, A and/or B may indicate three situations: A exists alone, A and B exist simultaneously, and B exists alone. The character "/" generally indicates that the contextual associated objects are in an "or" relationship.

When a photovoltaic module fails, there may be two situations. One situation is that the photovoltaic module is damaged or the photovoltaic module is shielded, which causes the photovoltaic module temperature to rise. Another situation is that the photovoltaic module is short-circuited due to a bypass diode, i.e., the photovoltaic module does not operate, which causes that the photovoltaic module temperature is low. Due to the difference in temperature between a normal photovoltaic module and a failed photovoltaic module, the related arts provide a method for determining an operating state of a photovoltaic module. Photovoltaic assemblies in a photovoltaic station are inspected with a drone equipped with an infrared image acquisition device. In this method, the operating state of the photovoltaic module is determined based on the acquired infrared images.

Regarding the method in the related arts, since the infrared image is greatly affected by temperature, when the ambient temperature of the photovoltaic station is high or low, it may not be able to distinguish between a normal photovoltaic module and a failed photovoltaic module, resulting in missed or false alarms, which makes the accuracy of determining the operating state of the photovoltaic module relatively low.

Figure 1:
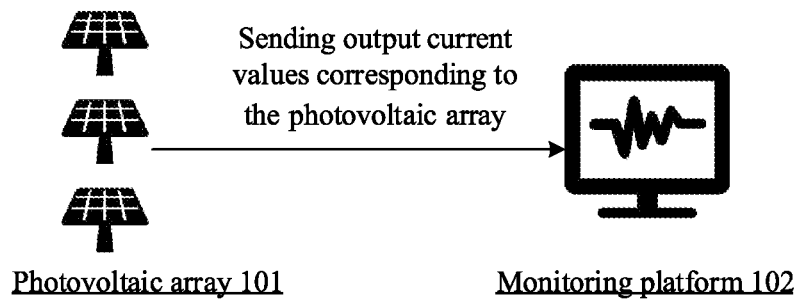
FIG. 1 shows a schematic diagram of an implementation environment according to an exemplary embodiment of the present disclosure.

In order to solve the above problem, a method for determining an operating state of a photovoltaic array is provided by an embodiment of the present disclosure. Refer to FIG. 1, which shows a schematic diagram of an implementation environment according to an exemplary embodiment of the present disclosure. The implementation environment includes a photovoltaic array 101 and a monitoring platform 102.

The photovoltaic array 101 is a photovoltaic power generation system formed by a plurality of photovoltaic strings in parallel, and refers to a set of all photovoltaic strings connected to a single combiner. An actual photovoltaic station includes a plurality of photovoltaic arrays 101. A current output by each photovoltaic string in the photovoltaic array 101 is combined by the combiner and then transmitted to an inverter. Usually, there are 8-16 photovoltaic strings in parallel in a photovoltaic array, and 24 photovoltaic assemblies in series in each photovoltaic string. In the embodiments of the present disclosure, the photovoltaic array 101 may be provided with a sensor that acquires operating state data of the photovoltaic array, such as a current sensor and a current transformer that acquire an output current of the photovoltaic string, and may send the acquired output current value to the monitoring platform 102.

The photovoltaic array 101 and the monitoring platform 102 are connected through a wired or wireless network.

The monitoring platform 102 is a computer device with functions such as storing a present output current value sent by the photovoltaic array 101, processing the data, and generating alarm records. The computer device may be a server, a server cluster composed of several servers, or a cloud server. In the embodiments of the present disclosure, the monitoring platform 102 may acquire a present output current value sent by the photovoltaic array 101, input the present output current value to a pre-trained abnormality score predicting model, output a present abnormality score corresponding to the present output current value, and compare the present abnormality score with a predetermined target abnormality score, so as to determine an operating state of the photovoltaic array. Optionally, the monitoring platform 102 may also store the acquired output current value in a database, so as to subsequently continuously train the abnormality score predicting model based on the output current value. In a possible implementation, upon determining that an abnormal photovoltaic string exists in the photovoltaic array, the monitoring platform 102 may generate an alarm record, so that the operation and maintenance personnel may learn the operating state of the photovoltaic array in time, and may solve the abnormal operating state problem of the photovoltaic string in time when there is a failure.

For ease of description, in the following method embodiments, the monitoring platform 102 being a computer device is merely taken as an example for introduction and illustration.

Figure 2:
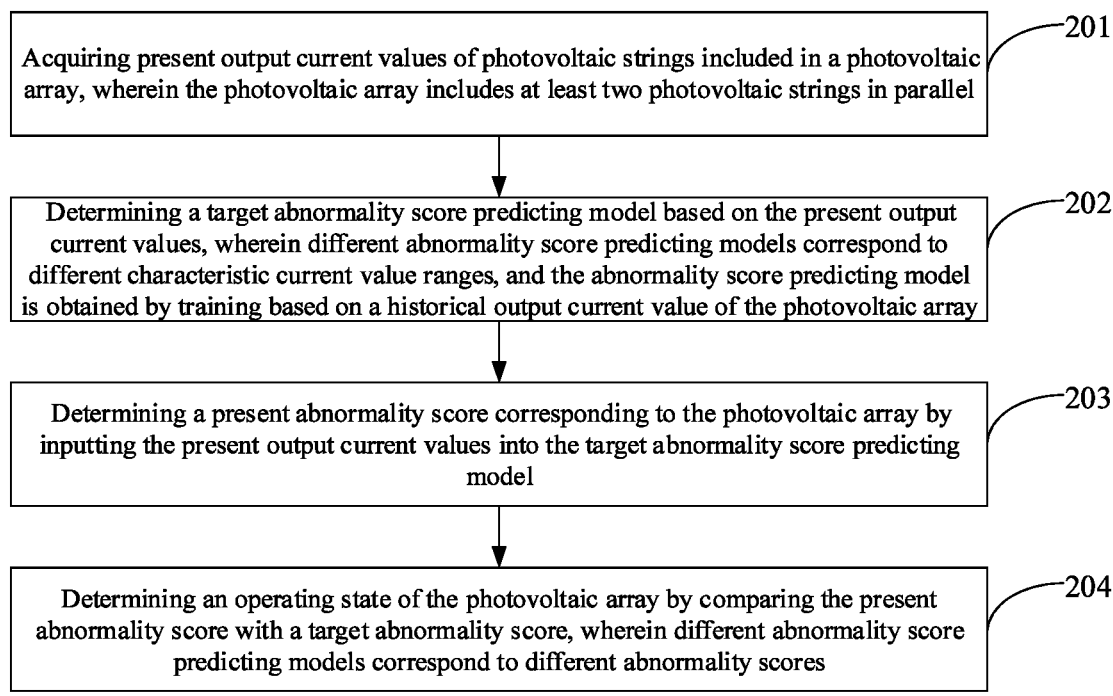
FIG. 2 shows a flowchart of a method for determining an operating state of a photovoltaic array according to an exemplary embodiment of the present disclosure.

Refer to FIG. 2, which shows a flowchart of a method for determining an operating state of a photovoltaic array according to an exemplary embodiment of the present disclosure. The method applicable to a computer device is taken as an example for illustration in the present embodiment and may include the following steps.

In step 201, present output current values of photovoltaic strings included in a photovoltaic array are acquired, wherein the photovoltaic array includes at least two photovoltaic strings in parallel.

Since the photovoltaic array is a photovoltaic power generation system formed by a plurality of photovoltaic strings in parallel, determining the operating state of the photovoltaic array is to determine the operating state of each photovoltaic string. Therefore, in a possible implementation, the acquired present output current values include the present output current value corresponding to each photovoltaic string.

As to the present output current value of the photovoltaic string, an induction coil may be adopted to detect the present output current of the photovoltaic string and may send the acquired present output current value to the computer device. Each photovoltaic string corresponds to a present output current value. The number of present output current values at a same sampling moment depends on the number of photovoltaic strings included in a photovoltaic array. For example, if a photovoltaic array includes 8 photovoltaic strings, the present output current values corresponding to the same sampling moment may include: $I_1$, $I_2$, $I_3$, $I_4$, $I_5$, $I_6$, $I_7$, and $I_8$.

In step 202, a target abnormality score predicting model is determined based on the present output current values, wherein different abnormality score predicting models correspond to different characteristic current value ranges, and the abnormality score predicting model is obtained by training based on a historical output current value of the photovoltaic array.

A plurality of abnormality score predicting models are pre-stored in the computer device. The abnormality score predicting model is obtained by training based on the historical output current value of the photovoltaic array. Different abnormality score predicting models correspond to different characteristic current value ranges. For example, a characteristic current value range corresponding to an abnormality score predicting model A is 0-2 A, a characteristic current value range corresponding to an abnormality score predicting model B is 2-4 A, and a characteristic current value range corresponding to an abnormality score predicting model C is 4-6 A, and the like.

Optionally, historical output current values corresponding to the photovoltaic array within 6 months may be acquired to construct a plurality of training samples to obtain the plurality of abnormality score predicting models by training.

In a possible implementation, the computer device determines a corresponding present characteristic current value by processing the present output current values, and determines a corresponding target abnormality score predicting model according to a relationship between the present characteristic current value and the characteristic current value range corresponding to each abnormality score predicting model. For example, if the present characteristic current value is 5 A, the abnormality score predicting model C is determined as the target abnormality score predicting model.

In step 203, a present abnormality score corresponding to the photovoltaic array is determined by inputting the present output current values into the target abnormality score predicting model.

In a possible implementation, after the target abnormality score predicting model is determined, the present abnormality score is output by inputting each present output current value into the target abnormality score predicting model.

Optionally, the present output current values may be input into the target abnormality score predicting model in the form of a matrix.

In step 204, an operating state of the photovoltaic array is determined by comparing the present abnormality score with a target abnormality score, wherein different abnormality score predicting models correspond to different abnormality scores.

As to the target abnormality score, the historical output current value may be input into the corresponding abnormality score predicting model in advance, and the output abnormality score may be determined as a standard abnormality score corresponding to the abnormality score predicting model (i.e., the target abnormality score), and the standard abnormality score is stored in association with the corresponding abnormality score predicting model.

In a possible implementation, after the present abnormality score is acquired, it may be compared with the target abnormality score which is stored in association with the target abnormality score predicting model. If a preset logical relationship is satisfied, it is output that the operating state of the photovoltaic array is normal. If the preset logical relationship is not satisfied, it is output that the operating state of the photovoltaic array is abnormal.

The preset logical relationship may be that the present abnormality score is less than or equal to the target abnormality score.

In summary, in the embodiments of the present disclosure, present output current values of photovoltaic strings included in a photovoltaic array are acquired, a target abnormality score predicting model is determined based on the present output current values, a present abnormality score corresponding to the photovoltaic array is output by inputting the present output current values into the target abnormality score predicting model, so as to compare the present abnormality score with a target abnormality score corresponding to the target abnormality score predicting model, and thus an operating state of the photovoltaic array is determined based on the comparison result. The present abnormality score is output by inputting the present output current values acquired in real-time into the abnormality score predicting model, so as to determine the present operating state of the photovoltaic array. Since the present output current value can reflect the operating state of the photovoltaic array in real-time, compared to a method for determining an operating state through an infrared image in the related arts, the interference of the ambient temperature on the infrared image can be avoided, thereby improving the accuracy of determining the operating state of the photovoltaic array.

In a possible application scenario, present output current values corresponding to a preset timestamp may be acquired simultaneously to construct a preset timestamp current matrix. The operating state of the photovoltaic array is determined by judging a relationship between an abnormality score corresponding to the preset timestamp (obtained by accumulating a present abnormality score corresponding to each sampling moment included in the preset timestamp) and an abnormality score threshold.

The preset timestamp may include M sampling moments, wherein M is an integer greater than or equal to 1.

Schematically, a current matrix corresponding to the preset timestamp may be:

$$I = \begin{bmatrix} I_{11} & \cdots & I_{1N} \\ \vdots & \ddots & \vdots \\ I_{M1} & \cdots & I_{MN} \end{bmatrix}$$

wherein $I_{MN}$ represents a present output current value corresponding to an $N^{th}$ photovoltaic string at an $M^{th}$ sampling moment.

As to the method for obtaining the abnormality score corresponding to the preset timestamp, firstly, different current sub-matrices (indicated by $I_i$) may be divided based on different sampling moments. Then a present characteristic current value corresponding to each current sub-matrix may be determined, so as to determine a target abnormality score predicting model corresponding to each current sub-matrix based on the determined present characteristic current value and a characteristic current value range corresponding to each abnormality score predicting model. Finally, a present abnormality score $S=[S_1 \ldots S_M]$ corresponding to each current sub-matrix (i.e., each sampling moment) is obtained by inputting each current sub-matrix into a corresponding target abnormality score predicting model, wherein $S_M$ represents the present abnormality score corresponding to the $M^{th}$ sampling moment. After accumulation, an abnormality score $S_T$ corresponding to the preset timestamp may be obtained.

Schematically, if M is 3 and N is 8, then the preset timestamp includes present output current values corresponding to 3 sampling moments, and each acquisition moment corresponds to 8 current values. Taking sampling moment 1 as an example, a present output current value corresponding to sampling moment 1 is determined as a current sub-matrix $I_1=[I_{11} \ldots I_{1N}]$, wherein $I_{1N}$ represents a present output current value corresponding to the $N^{th}$ photovoltaic string at the first sampling moment. A present characteristic current value corresponding to the current sub-matrix is determined, so as to determine its corresponding target abnormality score predicting model. The present abnormality score corresponding to the current sub-matrix (indicated by $S_1$) is obtained after inputting the current sub-matrix into the corresponding target abnormality score predicting model. In the same way, current sub-matrices $I_2$ and $I_3$ corresponding to the other two sampling moments, and their corresponding present abnormality scores $S_2$ and $S_3$ may be obtained. The abnormality score $S_T=S_1+S_2+S_3$ corresponding to the preset timestamp is obtained by accumulating each present abnormality scores.

As to the method for determining the abnormality score threshold, since the target abnormality score predicting model corresponding to each sampling moment may be different, and different abnormality score predicting models correspond to different target abnormality scores, after determining the target abnormality score predicting model corresponding to each sampling moment, a corresponding abnormality score threshold $S_{Threshold}$ within the preset timestamp is obtained by accumulating the target abnormality score corresponding to each target abnormality score predicting model. For example, the target abnormality score is 10-20, and the target abnormality score threshold is related to the number of sampling moments included in the preset timestamp.

Schematically, if M is 3, the preset timestamp current matrix may be divided into current sub-matrices $I_1$, $I_2$ and $I_3$. If the current sub-matrix $I_1$ corresponds to the abnormality score predicting model A, the current sub-matrix $I_2$ corresponds to the abnormality score predicting model B, the current sub-matrix $I_3$ corresponds to the abnormality score predicting model C, the abnormality score corresponding to the abnormality score predicting model A is $S_A$, the abnormality score corresponding to the abnormality score predicting model B is $S_B$, and the abnormality score corresponding to the abnormality score predicting model C is $S_C$, then the abnormality score threshold corresponding to the preset timestamp current matrix is $S_{Threshold}=S_A+S_B+S_C$.

As to the preset logical relationship, it may be $S_T \leq S_{Threshold}$. If the present abnormality score corresponding to the preset timestamp is less than or equal to the abnormality score threshold, it is output that the operating state of the photovoltaic array is normal. If the present abnormality score corresponding to the preset timestamp is greater than the target abnormality score threshold, it is output that the present operating state of the photovoltaic array is abnormal.

Optionally, after a present abnormality score corresponding to a certain current sub-matrix is acquired, it may be directly compared with its corresponding target abnormality score. If the present abnormality score is less than or equal to the target abnormality score, it is output that the operating state of the photovoltaic array is normal. If the present abnormality score is greater than the target abnormality score, a relationship between a present abnormality score corresponding to a next sampling moment and the target abnormality score is continuously judged until the circulated judgment of the corresponding sampling moments within the preset timestamp is all completed. If the present abnormality score corresponding to each sampling moment included in the preset timestamp is all greater than the target abnormality score, it is output that the operating state of the photovoltaic array is abnormal.

In the present embodiment, corresponding present output current values within a preset timestamp are acquired to construct a preset timestamp current matrix, a target abnormality score predicting model corresponding to each sampling moment is determined by analyzing the present output current value corresponding to each sampling moment included in the preset timestamp, and thus a present abnormality score corresponding to each sampling moment is obtained by inputting the present output current value corresponding to each sampling moment into the target abnormality score predicting model, an abnormality score corresponding to the preset timestamp is obtained by accumulating each present abnormality scores and is compared with an abnormality score threshold. If a preset logic relationship is satisfied, it is output that the operating state of the present photovoltaic array is normal. If not, it is output that the operating state of the photovoltaic array is abnormal. The operating state of the photovoltaic array is determined by acquiring the present output current values within the preset timestamp, which may improve the efficiency of determining the operating state of the photovoltaic array.

In a possible implementation, an abnormality score predicting model is obtained by training based on an acquired historical output current value corresponding to a photovoltaic array. Since there may be some abnormal or invalid data in the historical output current value, for example, current data at night (invalid data), or current data acquired when the combiner fails (or equipment that acquires the output current value fails) (abnormal data), which will all affect the accuracy of the abnormality score predicting model obtained by training Therefore, in order to improve the accuracy of the determined abnormality score predicting model, the acquired historical output current value needs to be filtered and processed according to certain data quality rules. The present embodiment focuses on describing the process of how to determine a current threshold, which is intended to filter a virtually high current value in the historical output current value.

Figure 3:
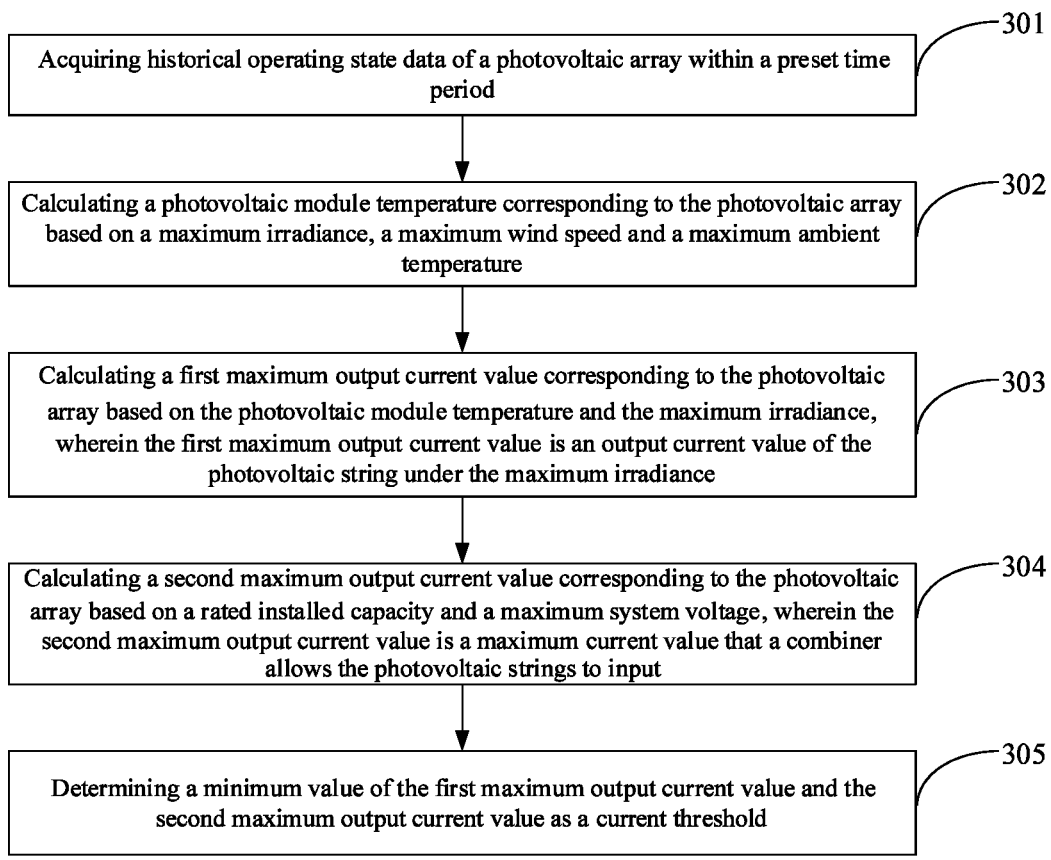
FIG. 3 shows a flowchart of a method for determining a current threshold according to an exemplary embodiment of the present disclosure.

Schematically, FIG. 3 shows a flowchart of a method for determining a current threshold according to an exemplary embodiment of the present disclosure. The method includes the following steps.

In step 301, historical operating state data of a photovoltaic array within a preset time period is acquired.

The historical operating state data includes a historical output current value of a photovoltaic string, a historical irradiance corresponding to the photovoltaic string, a historical ambient temperature and a historical wind speed of an environment where the photovoltaic string is located, or the like.

The preset time period may be the recent 6 months, or the recent 1 year.

In a possible implementation, historical output current values, historical irradiances, historical ambient temperatures, historical wind speeds, or the like of the photovoltaic array within the recent 6 months may be acquired. As to the method for acquiring the historical output current values, reference may be made to the above embodiment, which is not repeated in the present embodiment. The historical ambient temperatures and the historical wind speeds may be acquired by a temperature sensor and an anemometer installed in the photovoltaic station respectively.

The historical irradiance corresponding to the photovoltaic string may be acquired by an irradiator equipped in the photovoltaic station. An installation manner of the irradiator may be horizontal installation (i.e., horizontal irradiator). Irradiance data acquired by the horizontal irradiator needs to be converted into irradiance data corresponding to an inclination of the photovoltaic array. An installation manner with a same inclination and a same orientation as the photovoltaic array (inclination irradiator) may also be adopted. The irradiance acquired by this installation manner is the irradiance corresponding to the photovoltaic string. In a possible implementation, the computer device collects historical irradiance data acquired by the irradiator within 6 months and stores the same in a corresponding database for subsequent determination of the current threshold.

Optionally, the historical operating state data may be acquired based on a preset sampling frequency. For example, the preset sampling frequency is 5 min. The sampling frequency may be the same as a sampling frequency for acquiring the present output current values.

In step 302, a photovoltaic module temperature corresponding to the photovoltaic array is calculated based on a maximum irradiance, a maximum wind speed and a maximum ambient temperature.

The maximum irradiance is determined by the historical irradiances. That is, a maximum value of all historical irradiances within a sampling period is regarded as the maximum irradiance. The maximum ambient temperature is determined by the historical ambient temperatures. That is, a maximum value of all historical ambient temperatures within the sampling period is regarded as the maximum ambient temperature. The maximum wind speed is determined by the historical wind speeds. That is, a maximum value of all historical wind speeds within the sampling period is regarded as the maximum wind speed.

Schematically, a relationship among the irradiance, the wind speed, the ambient temperature and the photovoltaic module temperature may be expressed as:

$$T_m = G_{POA} \exp(a + bW_s) + T_a \quad (1)$$

wherein $T_m$ is the photovoltaic module temperature (the temperature of the back panel of the photovoltaic module), $G_{POA}$ is the irradiance (which corresponds to the inclination of the photovoltaic array), $W_s$ is the wind speed of the environment where the photovoltaic module is located, $T_a$ represents the ambient temperature of the environment where the photovoltaic module is located, and a and b are constants. The values of a and b are different depending on the type and the installation manner of the photovoltaic module. For specific values, see Table I:

TABLE I

| Assembly type | Installation manner | a | b |
| --- | --- | --- | --- |
| Dual-glass assembly | Fixed inclination | −3.47 | −0.0594 |
| Dual-glass assembly | Fixed inclination | −2.98 | −0.0471 |
| Conventional assembly | Fixed inclination | −3.56 | −0.075 |
| Conventional assembly | Color steel tile | −2.81 | −0.0455 |
| Thin-film assembly | Fixed inclination | −3.58 | −0.113 |

In a possible implementation, the photovoltaic module temperature $T_m$ is obtained by substituting the acquired maximum wind speed, maximum ambient temperature, and maximum irradiance into formula (1).

In step 303, a first maximum output current value corresponding to the photovoltaic array is calculated based on the photovoltaic module temperature and the maximum irradiance, wherein the first maximum output current value is an output current value of the photovoltaic string under the maximum irradiance.

Schematically, a relationship among the output current, the photovoltaic module temperature, and the irradiance may be expressed as:

$$I_1 = \frac{I_{ph,stc} G_{POA}}{1000}[1 + \beta(T_m - T_{stc})] \quad (2)$$

wherein $I_1$ is the output current, $I_{ph,stc}$ is the output current under a standard test condition; $G_{POA}$ is the inclination irradiation, $\beta$ is a current temperature rise coefficient of the photovoltaic module, $T_m$ is the photovoltaic module temperature (the temperature of the back panel of the photovoltaic module); and $T_{stc}$ is the temperature under the standard test condition, namely 25° C.

Standard test condition (STC) refers to a recognized test standard for photovoltaic assemblies in the photovoltaic field, namely 1.5; 1000 W/m²; 25° C. 1.5 refers to that the air mass (AM) is 1.5, that is, the actual distance that the light passes through the atmosphere is 1.5 times the vertical thickness of the atmosphere. 1000 W/m² is the irradiance of the sun under the standard test. 25° C. refers to that the photovoltaic module operates at 25° C.

In a possible implementation, since $I_{ph,stc}$, $\beta$, $T_{stc}$ and the like are default values, the first maximum output current value $I_1$ corresponding to the photovoltaic array may be obtained by substituting the photovoltaic module temperature $T_m$ and the maximum irradiance acquired in step 302 into formula (2).

In step 304, a second maximum output current value corresponding to the photovoltaic array is calculated based on a rated installed capacity and a maximum system voltage, wherein the second maximum output current value is a maximum current value that a combiner allows the photovoltaic strings to input.

The rated installed capacity is a rated power of the combiner connected to the photovoltaic array. The maximum system voltage is a system voltage of an inverter connected to the combiner.

Schematically, a relationship among the rated installed capacity, the maximum system voltage and the second maximum output current may be expressed as:

$$I_2 = \frac{2P_{cbx,rated}}{V_{inv,max\_system}} \quad (3)$$

wherein $P_{cbx,rated}$ is the rated installed capacity of the combiner, $V_{inv,max\_system}$ is the maximum system voltage of the inverter, and $I_2$ is the second maximum output current. From formula (3), it may be seen that the second maximum output current has nothing to do with the historical operating data of the photovoltaic array. That is, for the same combiner, the second maximum output current is fixed.

In a possible implementation, the second maximum output current value, i.e., $I_2$, may be obtained by calculating based on the rated installed capacity of the combiner and the maximum system voltage of the inverter.

In step 305, a minimum value of the first maximum output current value and the second maximum output current value is determined as a current threshold.

In a possible implementation, a minimum value of the first maximum output current and the second maximum output current value is determined as a current threshold. For example, the current threshold may be 10 A. If the acquired output current value of the photovoltaic string is higher than the current threshold, it indicates that the output current value corresponding to the photovoltaic string is virtually high. The reason for the current value being virtually high may be a problem with the combiner device or a failure of an induction coil detecting the current of the photovoltaic string, which does not belong to a range of the photovoltaic string failure. Therefore, it is necessary to filter the historical operating state data based on the determined current threshold to remove the virtually high current value.

Schematically, the current threshold may be represented by $I_{threshold}$. A relationship among the current threshold, the first maximum output current value $I_1$ and the second maximum output current value $I_2$ may be expressed as (taking a minimum value of $I_1$ and $I_2$):

$I_{threshold}=\min(I_1,I_2)$

Schematically, if $I_1=10$ A and $I_2=10.5$ A, then the current threshold $I_{threshold}=10$ A.

In the present embodiment, historical operating state data corresponding to a photovoltaic array within a preset time period is acquired for obtaining a current threshold corresponding to the photovoltaic array by analysis, so as to filter and process the historical operating state data according to preset data quality rules, thereby improving the accuracy of the abnormality score predicting model obtained by training.

In a possible implementation, after the acquired historical output current values within the preset time period are preprocessed based on the acquired current threshold in the above embodiment, the abnormality score predicting model may be trained based on the filtered historical output current values. The present embodiment focuses on describing how to obtain the abnormality score predicting model by training based on the filtered historical output current values.

Figure 4:
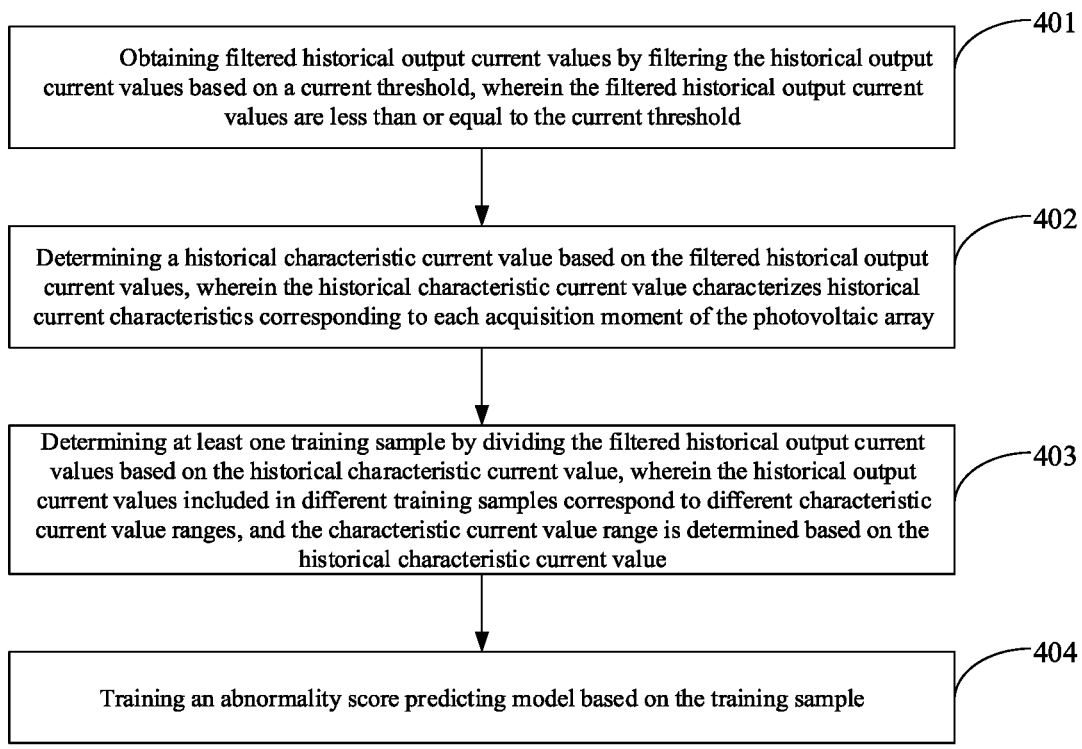
FIG. 4 shows a flowchart of a method for determining an abnormality score predicting model according to an exemplary embodiment of the present disclosure.

Schematically, FIG. 4 shows a flowchart of a method for determining an abnormality score predicting model according to an exemplary embodiment of the present disclosure. The method includes the following steps.

In step 401, filtered historical output current values are obtained by filtering historical output current values based on a current threshold, wherein the filtered historical output current values are less than or equal to the current threshold.

In a possible implementation, the historical output current values may be filtered according to preset data quality rules. The data quality rules may include: removing night data (for example, removing data before 7 am and after 6 pm), removing repeated timestamp data, removing data exceeding the current threshold, removing data within a time period when the combiner is not connected (the combiner is shut down), removing stuck data (stuck data refers to that the data is not refreshed for more than a preset time, for example, more than 10 minutes), removing data with irradiance less than 20 W/m², supplementing vacancy values, and the like.

After removing the data exceeding the current threshold, a current vacancy value corresponding to the acquisition moment needs to be supplemented. A current average of effective time points before and after the acquisition moment corresponding to the vacancy value may be regarded as a filling value instead of the vacancy value. For example, a current value corresponding to 10:05:00 is 18 A, which is greater than the current threshold 10 A. A current value acquired at 10:00:00 is 6.7 A, which is less than the current threshold 10 A. A current value acquired at 10:10:00 is 6.9 A, which is also less than the current threshold 10 A. Then a current average of 6.8 A may be regarded as an output current value corresponding to 10:05:00.

In a possible implementation, the historical output current values after being processed by the preset data quality rules are determined as basic data for training the abnormality score predicting model.

In step 402, a historical characteristic current value is determined based on the filtered historical output current values, wherein the historical characteristic current value characterizes historical current characteristics corresponding to each acquisition moment of the photovoltaic array.

Due to differences in the historical output current values corresponding to different acquisition moments in a day, in order to obtain the abnormality score predicting model corresponding to each acquisition moment by training more accurately, the historical output current values may be divided based on the historical characteristic current value corresponding to each acquisition moment. Data that meets a same characteristic current value range is regarded as basic data for training the abnormality score predicting model. For example, 0-2 A in the historical output current values is divided as a training sample A1, 2-4 A in the historical output current values is divided as a training sample A2, 4-6 A in the historical output current values is divided as a training sample A3, and so on. The historical output current values may be divided into different levels (i.e., different training samples) based on the historical characteristic current value.

As to acquiring the basis for dividing the training samples, in a possible implementation, the division is performed based on the historical characteristic current value. The method for determining the historical characteristic current value may be as follows. Taking the preset time period being 6 months, the sampling time interval being 1 min, and the photovoltaic array including 8 photovoltaic strings as an example, there are 6×30×12×60 historical output current values corresponding to the same photovoltaic string at the same acquisition moment. First of all, as to these 129,600 historical output current values, a historical output current value corresponding to a K percentile is regarded as the historical output current value corresponding to the photovoltaic string at the acquisition moment, and K is an integer greater than 50. That is, the historical output current value above the median is taken. According to the above steps, the historical output current value corresponding to each acquisition moment in a day of the same photovoltaic string may be determined. In the same way, the historical output current values corresponding to each acquisition moment of all photovoltaic strings may be obtained.

Schematically, the historical output current values corresponding to each acquisition moment in a day of all photovoltaic strings may be expressed in the form of a matrix as:

$$I_T = \begin{bmatrix} I_{11} & \cdots & I_{1j} \\ \vdots & \ddots & \vdots \\ I_{i1} & \cdots & 1_{ij} \end{bmatrix}$$

wherein $I_T$ represents the matrix of historical output current values, and $I_{ij}$ represents the historical output current value corresponding to the $j^{th}$ photovoltaic string at the $i^{th}$ sampling moment.

In a possible implementation, after the matrix of historical output current values is acquired, a plurality of historical characteristic current values $I_{ti}$ may be extracted therefrom. The method for extracting the historical characteristic current value may be that for a plurality of branch current values corresponding to the same sampling moment (i.e., the historical output current values corresponding to each photovoltaic string), the historical output current value corresponding to the K percentile is taken as the historical characteristic current value corresponding to the acquisition moment, and K is an integer greater than or equal to 50. That is, the historical output current value above the median is taken. In the same way, the historical characteristic current values corresponding to each sampling moment may be obtained.

Schematically, the obtained set of historical characteristic current values may be $I_K=[I_{t1} \ldots I_{ti}\ I_{t(i+1)}]$, wherein $I_{ti}$ represents the historical characteristic current value corresponding to the $i^{th}$ sampling moment.

In step 403, at least one training sample is determined by dividing the filtered historical output current values based on the historical characteristic current value, wherein the historical output current values included in different training samples correspond to different characteristic current value ranges, and the characteristic current value range is determined based on the historical characteristic current value.

In a possible implementation, after the historical characteristic current value corresponding to each sampling moment is determined, at least one training sample may be determined by dividing the filtered historical output current values based on the historical characteristic current value, so as to obtain at least one abnormality score predicting model by training.

As to the method for dividing the filtered historical output current values based on the historical characteristic current value, in a possible implementation, firstly, a plurality of characteristic current value ranges are obtained by arranging the obtained historical characteristic current values in an ascending order and regarding two adjacent historical characteristic current values as a characteristic current value range. A plurality of training samples are obtained by determining a historical output current value satisfying the characteristic current value range as a training sample. Different training samples correspond to different characteristic current value ranges.

Schematically, if the historical characteristic current value is $I_K=[I_{t1} \ldots I_{ti}\ I_{t(i+1)}]$, and $I_{ti} < I_{t(i+1)}$, then the training sample is $I_{Ki}=[I_1\ I_2\ \ldots\ I_n]$, wherein the training sample $I_{Ki} \in [I_{ti}, I_{t(i+1)}]$, representing that the historical output current values in the training sample $I_{Ki}$ are all within the characteristic current value range from $I_{ti}$ to $I_{t(i+1)}$.

In step 404, the abnormality score predicting model is trained based on the training sample.

In a possible implementation, the abnormality score predicting model adopts an Isolation Forest algorithm. After a plurality of training samples are determined, the abnormality score predicting model may be trained based on the training sample.

In a possible implementation, the abnormality score predicting model may be obtained by training based on the following steps.

1. A training sample $I_{Ki}$ is acquired, and $\Psi$ pieces of sample data are randomly selected from the training sample $I_{Ki}$ as sub-samples to construct a binary tree.

Since the abnormality score predicting model is composed of a plurality of binary trees, in the process of training the abnormality score predicting model, each binary tree needs to be constructed. That is, the training sample needs to be divided into a plurality of sub-samples to construct a binary tree respectively according to each binary tree. Experiments show that when 100 binary trees exist in the abnormality score predicting model and the data volume included in the sub-samples is 256, the obtained abnormality score predicting model can achieve a better prediction effect.

Schematically, 256 pieces of sample data may be randomly selected as a sub-sample A from the training sample $I_{Ki}$, and a first binary tree may be constructed based on the sub-sample A.

Optionally, the data volume of the sub-sample and the number of binary trees included in the abnormality score predicting model may be set by the operation and maintenance personnel as needed, which is not limited in the present embodiment.

2. A value between the maximum value and the minimum value of the historical output current values included in the sub-sample is randomly generated as a boundary characteristic value $I_p$.

In a possible implementation, the historical output current values may be regarded as dimensions for dividing each node of the binary tree, and a value between the maximum value and the minimum value of the historical output current values on the node is randomly selected as the boundary characteristic value.

Figure 5:
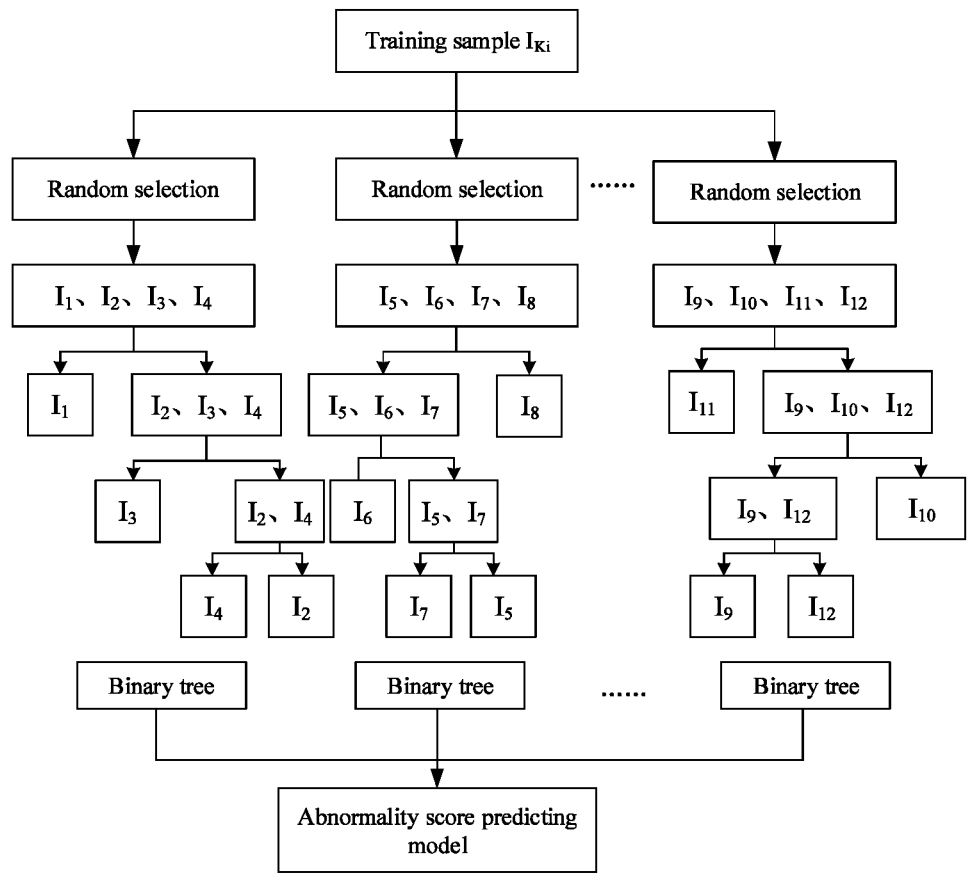
FIG. 5 shows a schematic diagram of a process of constructing an abnormality score predicting model according to an exemplary embodiment of the present disclosure.

Schematically, as shown in FIG. 5, if a training sub-sample includes 4 pieces of sample data $I_{KA}=[I_1\ I_2\ I_3\ I_4]$ to construct the first binary tree, a value $I_p$ is randomly selected from the maximum value and the minimum value of the sample data as the boundary characteristic value.

3. The current node data is divided based on the boundary characteristic value $I_p$. Node data less than $I_p$ is divided as a left child node, and node data greater than or equal to $I_p$ is divided as a right child node.

Schematically, as shown in FIG. 5, if the historical output current value in the training sub-sample is less than $I_p$, it is divided as a left child node. If the historical output current value in the training sub-sample is greater than or equal to $I_p$, it is divided as a right child node. For example, if $I_1$ is less than $I_p$, it is divided as a left child node. If $I_2$, $I_3$, and $I_4$ are greater than or equal to $I_p$, they are divided as right child nodes.

4. The above steps 2 to 3 are performed on the left child node and the right child node of the node respectively to continuously construct new leaf nodes until preset conditions are satisfied, then the training ends and a binary tree is generated.

The preset conditions may include: (1) whether the present binary tree reaches a preset depth; (2) only one piece of sample data exists on the child node; (3) the sample data on the child nodes have the same characteristics.

Schematically, as shown in FIG. 5, the right child node further includes 3 pieces of training sample data ($I_2$, $I_3$, $I_4$), these 3 pieces of training sample data have different characteristics, and division may be performed continuously. However, the left child node only includes 1 piece of training sample data ($I_1$), and division may not be continued. As to the right child node, division may be performed continuously according to the above steps 2 and 3. For example, $I_3$ is divided as a left child node, $I_2$ and $I_4$ are divided as right child nodes, and the like, until it is judged that the binary tree satisfies the above preset conditions, then the training ends and a binary tree is generated.

5. $\Psi$ pieces of sample data are randomly selected again from the training sample $I_{Ki}$ as a sub-sample to construct a second binary tree according to steps 2 to 4.

In a possible implementation, after a binary tree is generated, training sub-samples are randomly selected again from the training sample $I_{Ki}$. For example, training sub-samples $I_{KB}=[I_5\ I_6\ I_7\ I_8]$, $I_{KC}=[I_9\ I_{10}\ I_{11}\ I_{12}]$, $I_{KD}=[I_{13}\ I_{14}\ I_{15}\ I_{16}]$, and the like, are randomly selected, and a plurality of binary trees are generated based on each training sub-sample.

6. When the number of binary trees satisfies a preset number, an abnormality score predicting model is formed based on the plurality of constructed binary trees.

In a possible implementation, when the number of constructed binary trees satisfies a number threshold, for example, the preset number is 100, an abnormality score predicting model is formed based on the 100 constructed binary trees.

Optionally, the above embodiment only describes a process of training an abnormality score predicting model. Since the filtered historical output current values are divided into a plurality of training samples based on the historical characteristic current value, the training of a plurality of abnormality score predicting models may be realized according to the above steps 1 to 6.

Optionally, as the historical output current values are continuously updated, the abnormality score predicting model may be retrained at any time with the updated historical output current values.

In the present embodiment, the acquired historical output current values are filtered based on the current threshold to remove virtually high current values in order to avoid the influence on the accuracy of the abnormality score predicting model. In addition, the abnormality score predicting model adopts the Isolation Forest algorithm, which can effectively identify isolated data points in training samples.

In a possible implementation, after the training of the abnormality score predicting model is completed, an abnormality score corresponding to the abnormality score predicting model may be obtained by inputting the training sample $I_{Ki}$ into the abnormality score predicting model again.

Figure 6:
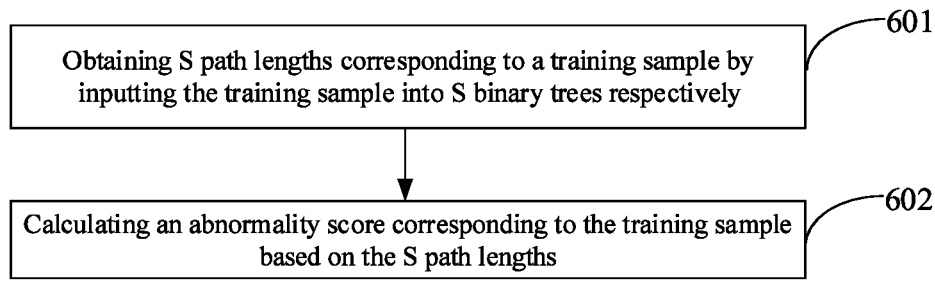
FIG. 6 shows a flowchart of a method for determining an abnormality score according to an exemplary embodiment of the present disclosure.

Refer to FIG. 6, which shows a flowchart of a method for determining an abnormality score according to an exemplary embodiment of the present disclosure. The method includes the following steps.

In step 601, S path lengths corresponding to a training sample are obtained by inputting the training sample into S binary trees respectively.

In a possible implementation, it is set that there are S binary trees in the abnormality score predicting model, and S path lengths corresponding to the training sample are obtained by inputting the training sample into the corresponding abnormality score predicting model, that is, a path length of the training sample on each binary tree, and then the S path lengths are recorded.

In step 602, an abnormality score corresponding to the training sample is calculated based on the S path lengths.

Schematically, a relationship between the path length and the abnormality score may be expressed as:

$$S(x,\Psi) = 2^{-\frac{E(h(x))}{c(\Psi)}} \qquad (4)$$

wherein $S(x,\Psi)$ is the abnormality score corresponding to the training sample, $c(\Psi)$ is an average path length of each binary tree in the abnormality score predicting model, $h(x)$ is the path length of the training sample on each binary tree, and E is averaging.

As to the average path length $c(\Psi)$ of the binary tree, the satisfied relation may be:

$$c(\Psi) = \begin{cases} 2H(\Psi-1) - \frac{2(\Psi-1)}{\Psi}, & \Psi > 2 \\ 1, & \Psi = 2 \\ 0, & \text{otherwise} \end{cases}$$

wherein $\Psi$ is the sample date volume included in the training sample, and $H(\Psi-1)$ is a harmonic number, which may be estimated as $H(\Psi-1)=\ln^{(\Psi-1)}+\zeta$, Euler's constant $\zeta=0.5772156649$.

In a possible implementation, S path lengths, i.e., $h(x)$, are obtained by inputting the training sample into the corresponding abnormality score predicting model. The S path lengths are averaged to obtain $E(h(x))$ to be substituted into formula (4) to calculate an abnormality score corresponding to the training sample, i.e., an abnormality score corresponding to the abnormality score predicting model (standard abnormality score).

In the present embodiment, path lengths of a training sample on S binary trees may be obtained by inputting the training sample into a corresponding abnormality score predicting model, and an abnormality score corresponding to the abnormality score predicting model may be obtained by calculating based on the S path lengths, so as to be compared with a present abnormality score subsequently to determine an operating state of a photovoltaic array.

In a possible implementation, in order to eliminate false alarm situations caused by accidental factors, present abnormality scores corresponding to N continuous sampling moments should be judged, so as to improve the alarm accuracy.

Figure 7:
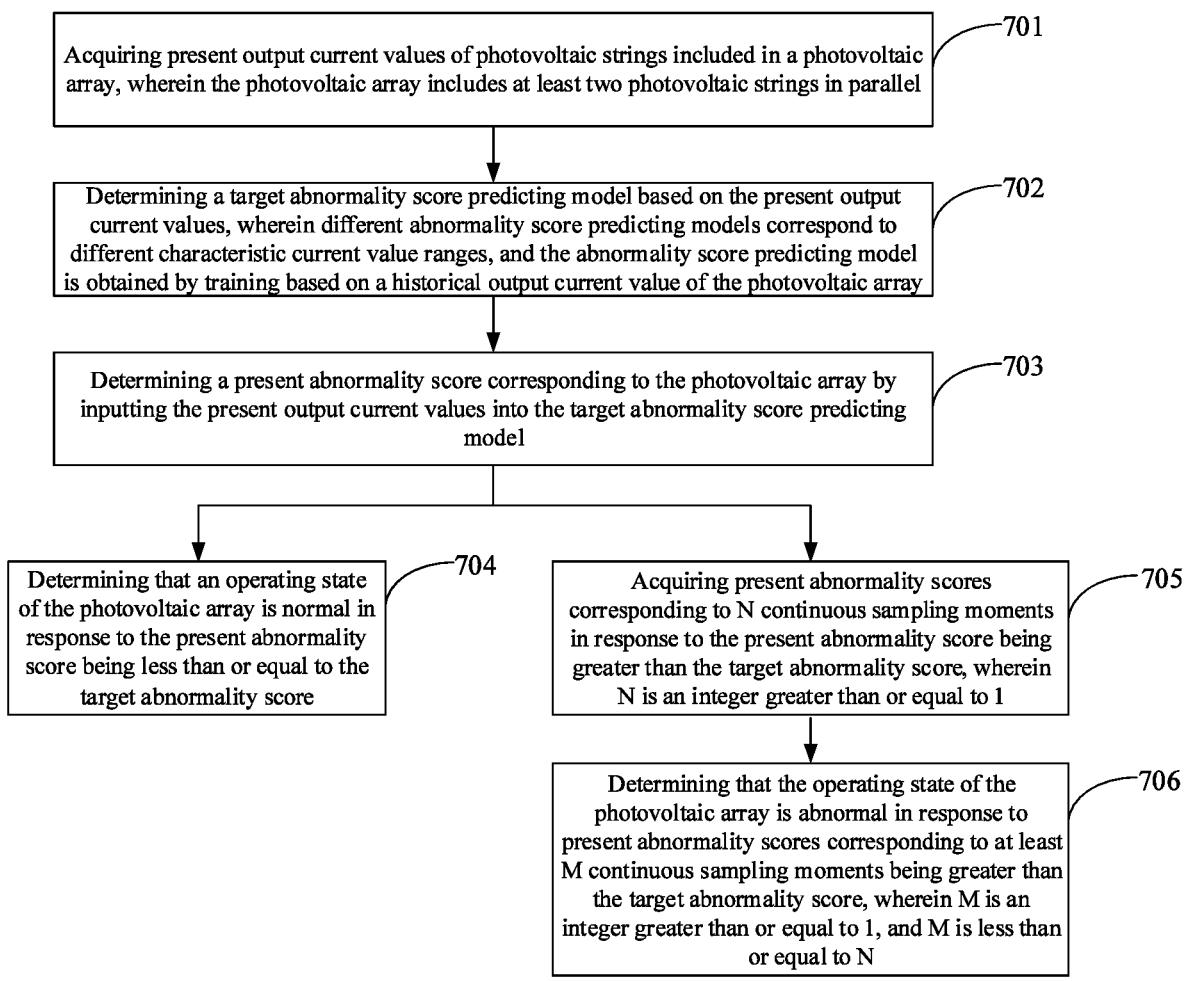
FIG. 7 shows a flowchart of a method for determining an operating state of a photovoltaic array according to another exemplary embodiment of the present disclosure.

Refer to FIG. 7, which shows a flowchart of a method for determining an operating state of a photovoltaic array according to another exemplary embodiment of the present disclosure. In the present embodiment, the method applicable to a computer device is taken as an example for illustration. The method includes the following steps.

In step 701, present output current values of photovoltaic strings included in a photovoltaic array are acquired, wherein the photovoltaic array includes at least two photovoltaic strings in parallel.

For the implementation of this step, reference may be made to step 201, which is not repeated in the present embodiment.

In step 702, a target abnormality score predicting model is determined based on the present output current values, wherein different abnormality score predicting models correspond to different characteristic current value ranges, and the abnormality score predicting model is obtained by training based on a historical output current value of the photovoltaic array.

When a combiner device or an induction coil that detects an output current of a string fails, the acquired present output current values will be virtually high. If there is virtually high current value in the acquired present output current values, the determined present abnormality score will be high, which will affect the judgment of the operating state of the photovoltaic array. Therefore, before inputting the present characteristic current value into the target abnormality score predicting model, the present output current values need to be preprocessed, for example, to remove the virtually high current values in the present output current values.

Figure 8:
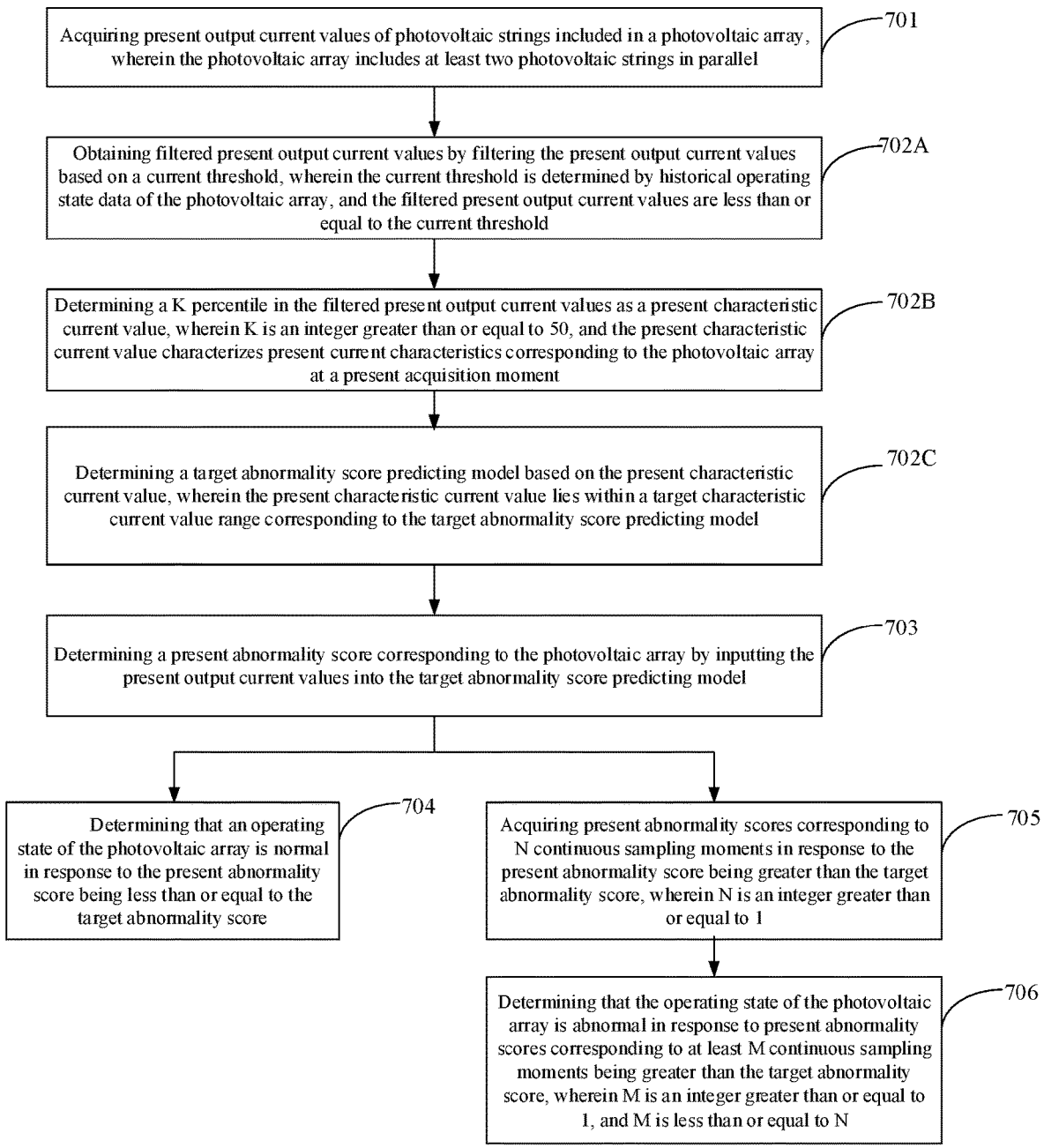
FIG. 8 shows a flowchart of a method for determining an operating state of a photovoltaic array according to still another exemplary embodiment of the present disclosure.

Schematically, as shown in FIG. 8, step 702 may include step 702A, step 702B, and step 702C.

In step 702A, filtered present output current values are obtained by filtering the present output current values based on a current threshold, wherein the current threshold is determined by historical operating state data of the photovoltaic array, and the filtered present output current values are less than or equal to the current threshold.

For the method for determining the current threshold, reference may be made to the above embodiment, which is not repeated in the present embodiment.

In a possible implementation, if a plurality of present output current values are acquired at the same acquisition moment, the plurality of present output current values are filtered based on the current threshold. That is, the present output current values that are greater than the current threshold are removed, and there is no need to fill the vacancy values.

Schematically, for example, the acquired present output current values may be $I_1=6.3$ A, $I_2=7$ A, $I_3=6.5$ A, $I_4=6.4$ A, $I_5=6.7$ A, $I_6=7$ A, $I_7=18$ A, $I_8=6.9$ A, and the current threshold is $I_{threshold}=10$ A. The present output current values may be filtered according to a relationship between the current threshold and the present output current values. Since $I_7 > I_{threshold}$, the present output current value corresponding to $I_7$ is removed.

As to the present output current values acquired in real-time, after the virtually high current values are removed, if a vacancy value exists, the vacancy value does not need to be filled. Only the remaining present output current values need to be subsequently analyzed. Also, if a virtually high current value exists, other alarms will be triggered, such as a combiner device failure alarm, an induction coil failure alarm, or the like, which have nothing to do with the photovoltaic array failure alarm in the present disclosure.

In step 702B, a K percentile in the filtered present output current values is determined as a present characteristic current value, wherein K is an integer greater than or equal to 50, and the present characteristic current value characterizes present current characteristics corresponding to the photovoltaic array at a present acquisition moment.

In a possible implementation, a K percentile in the present output current values with the virtually high current values removed is determined as a present characteristic current value. By default, when K is an integer greater than or equal to 50, the obtained present characteristic current value characterizes the present current characteristics corresponding to the photovoltaic array at the present acquisition moment.

Schematically, if the filtered present output current values are $I_1=6.3$ A, $I_2=7$ A, $I_3=6.5$ A, $I_4=6.4$ A, $I_5=6.7$ A, $I_6=7$ A, $I_8=6.9$ A, then the present output current values are arranged in order. A median (K=50) is taken to obtain the present characteristic current value $I_K=6.7$ A.

In step 702C, a target abnormality score predicting model is determined based on the present characteristic current value, wherein the present characteristic current value lies within a target characteristic current value range corresponding to the target abnormality score predicting model In a possible implementation, after the present characteristic current value corresponding to the present acquisition moment is acquired, the target abnormality score predicting model may be determined based on the present characteristic current value. The present characteristic current value lies within a target characteristic current value range corresponding to the target abnormality score predicting model.

Schematically, if the present characteristic current value is 6.7 A and the characteristic current value range corresponding to an abnormality score predicting model D is 6-8 A, the abnormality score predicting model D is determined as the target abnormality score predicting model.

In step 703, a present abnormality score corresponding to the photovoltaic array is determined by inputting the present output current values into the target abnormality score predicting model.

In a possible implementation, after the target abnormality score predicting model is determined, the present output current values may be regarded as a test sample to be input into the target abnormality score predicting model, so as to output a present abnormality score corresponding to the photovoltaic array at the current acquisition moment.

Schematically, the process of determining the present abnormality score may include the following steps.

1. S path lengths corresponding to a test sample are obtained by inputting the test sample into S binary trees respectively.

2. A present abnormality score corresponding to the test sample is calculated based on the S path lengths.

For the implementation of determining the present abnormality score, reference may be made to the above embodiment, which is not repeated in the present embodiment.

In step 704, it is determined that the operating state of the photovoltaic array is normal in response to the present abnormality score being less than or equal to the target abnormality score.

In a possible implementation, if the present abnormality score is less than or equal to the target abnormality score, it indicates that the deviation of the present output current values is small and basically no isolated current value exists, and the operating state of the photovoltaic array is determined to be normal.

In step 705, present abnormality scores corresponding to N continuous sampling moments are acquired in response to the present abnormality score being greater than the target abnormality score, wherein N is an integer greater than or equal to 1.

In a possible implementation, if the present abnormality score is greater than the target abnormality score, it indicates that the deviation of the present output current values is large and an isolated current value exists, and an abnormal photovoltaic string may exist. In order to avoid the influence of accidental factors, it is necessary to acquire present abnormality scores corresponding to a plurality of continuous sampling moments and to compare the present abnormality scores with the target abnormality score.

In step 706, it is determined that the operating state of the photovoltaic array is abnormal in response to present abnormality scores corresponding to at least M continuous sampling moments being greater than the target abnormality score, wherein M is an integer greater than or equal to 1, and M is less than or equal to N.

In a possible implementation, if among the acquired present abnormality scores corresponding to the N continuous sampling moments, present abnormality scores corresponding to M continuous sampling moments are all greater than the target abnormality score, then the operating state of the photovoltaic array is determined to be abnormal.

Schematically, if the present sampling moment is moment a and the present abnormality score corresponding to the acquisition moment a is greater than the target present abnormality score, then moment a is marked as a first abnormal moment $t_1$, and a relationship between a present abnormality score at the next acquisition moment (moment a+1) and the target abnormality score is continuously judged. If the present abnormality score corresponding to moment a+1 is also greater than the target abnormality score, moment a+1 is marked as a second abnormal moment $t_2$, and the above judging step is repeated. If the present abnormality scores corresponding to M continuous sampling moments are all greater than the target abnormality score, it is determined that an abnormal photovoltaic string exists in the photovoltaic array.

The time corresponding to the M continuous sampling moments may be a time difference between the $i^{th}$ abnormal moment and the first abnormal moment. That is, it needs to satisfy $t_i - t_1 \geq T_{ts}$ before outputting that an abnormal photovoltaic string exists in the photovoltaic array, wherein ti is the first abnormal moment, $t_i$ is the $i^{th}$ abnormal moment, and $T_{ts}$ is the time threshold.

Optionally, if the continuous abnormal moment is less than the time threshold, it should be output that the operating state of the photovoltaic array is normal.

Optionally, the time threshold may be set by the operation and maintenance personnel as needed. For example, the time threshold may be 15 min or 60 min.

In the present embodiment, present current output values acquired in real-time are filtered by a current threshold to remove the influence of virtually high current values on the determination of the present abnormality score. In addition, by setting a time threshold, only when the present abnormality scores within a preset time period are all greater than the target abnormality score will a photovoltaic string abnormality alarm be triggered, which can avoid false alarms caused by accidental factors and improve the alarm accuracy.

In a possible implementation, when it is determined that the photovoltaic array is failed, the computer device may also generate an alarm record, so that the operation and maintenance personnel may determine which abnormal photovoltaic strings exist in the photovoltaic array based on the alarm record, inspect abnormal photovoltaic strings offline, and solve the problem that the operating state of the photovoltaic string is abnormal in time.

1. A minimum output current value of the present output current values corresponding to the M continuous sampling moments is determined.

If it is determined that an abnormal photovoltaic string exists in the photovoltaic array, a plurality of minimum output current values may be determined based on the present output current values corresponding to the M continuous sampling moments. For example, if M is 3, then a minimum current value of the present output current values corresponding to each sampling moment is determined, and 3 continuous sampling moments correspond to 3 minimum output current values.

2. A photovoltaic string corresponding to the minimum output current value is determined as an abnormal photovoltaic string.

Since the output current value is small and differs greatly from the present characteristic current value, the abnormality score is high. Therefore, a photovoltaic string corresponding to the minimum output current value is determined as an abnormal photovoltaic string, and the abnormal photovoltaic string information is regarded as an alarm content which is notified to the operation and maintenance personnel.

Optionally, the alarm record may include the present characteristic current value, the minimum output current value, the maximum output current value, and the abnormal photovoltaic string information corresponding to the abnormal acquisition moment.

In the present embodiment, an alarm record including information such as a minimum output current value, abnormal photovoltaic string information, a maximum output current value, and a present characteristic current value is generated, so as to promptly notify the operation and maintenance personnel to conduct offline inspections to solve the problem that an operating state of the photovoltaic string is abnormal.

Figure 9:
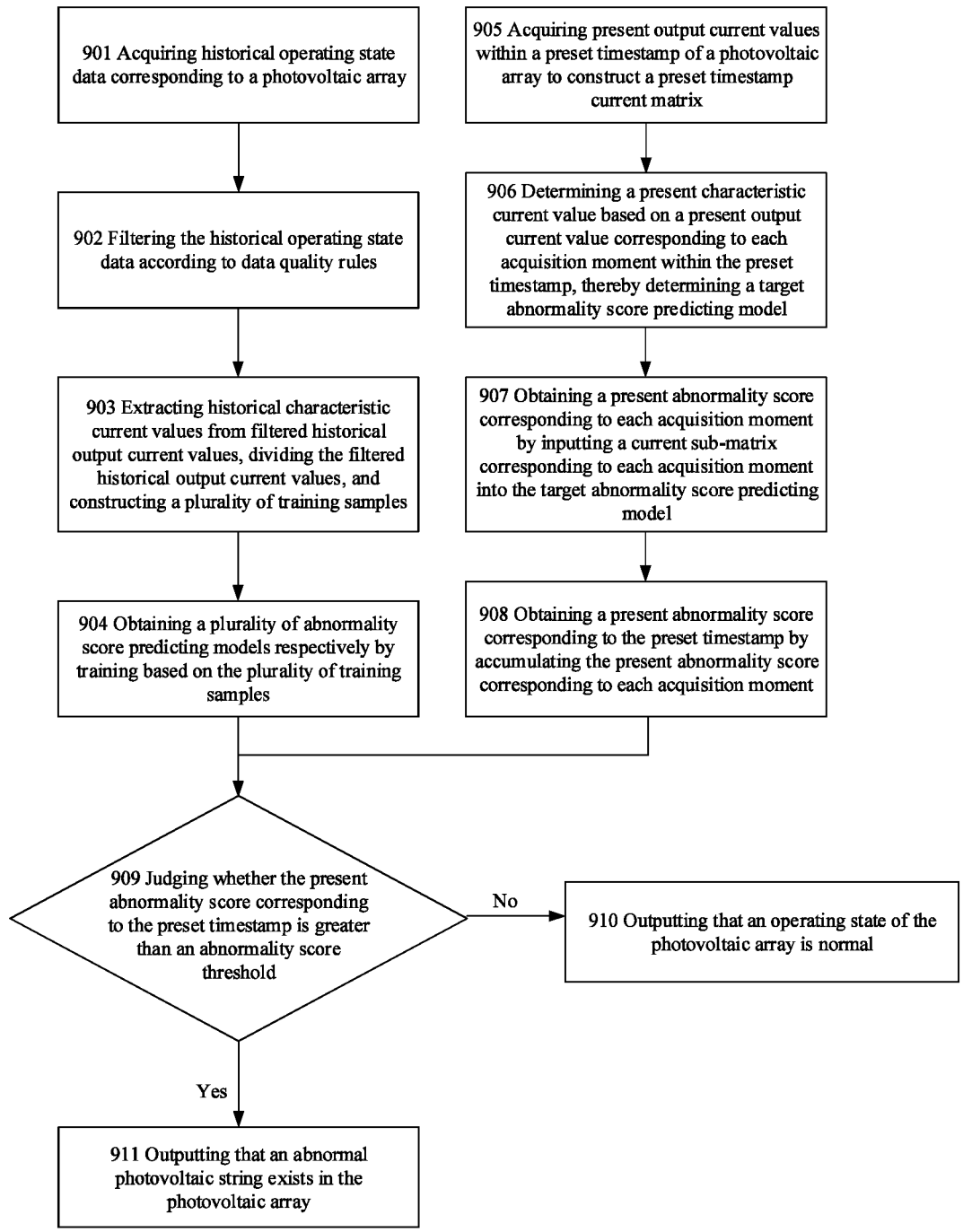
FIG. 9 shows a flowchart of a method for determining an operating state of a photovoltaic array according to yet another exemplary embodiment of the present disclosure.

Refer to FIG. 9, which shows a flowchart of a method for determining an operating state of a photovoltaic array according to yet another exemplary embodiment of the present disclosure. The process may include the following steps.

In step 901, historical operating state data corresponding to a photovoltaic array is acquired.

In step 902, historical output current values are filtered according to data quality rules.

In step 903, historical characteristic current values are extracted from filtered historical output current values to divide the filtered historical output current values and to construct a plurality of training samples.

In step 904, a plurality of abnormality score predicting models are obtained respectively by training based on the plurality of training samples.

In step 905, present output current values within a preset timestamp of the photovoltaic array are acquired to construct a preset timestamp current matrix.

In step 906, a present characteristic current value is determined based on a present output current value corresponding to each acquisition moment within the preset timestamp, thereby determining a target abnormality score predicting model.

In step 907, a present abnormality score corresponding to each acquisition moment is obtained by inputting a current sub-matrix corresponding to each acquisition moment into the target abnormality score predicting model.

In step 908, a present abnormality score corresponding to the preset timestamp is obtained by accumulating the present abnormality score corresponding to each acquisition moment.

In step 909, whether the present abnormality score corresponding to the preset timestamp is greater than an abnormality score threshold is judged.

In step 910, it is output that the operating state of the photovoltaic array is normal.

In step 911, it is output that an abnormal photovoltaic string exists in the photovoltaic array.

Figure 10:
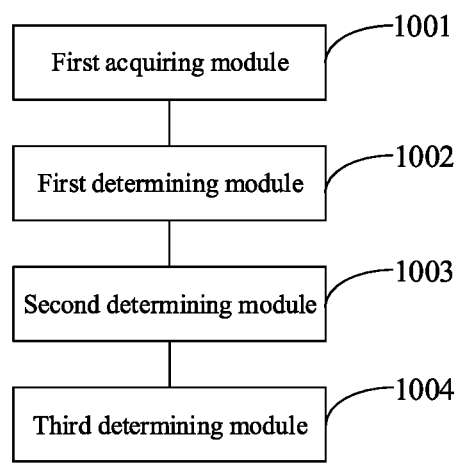
FIG. 10 shows a structural block diagram of an apparatus for determining an operating state of a photovoltaic array according to an exemplary embodiment of the present disclosure.

Refer to FIG. 10, which shows a structural block diagram of an apparatus for determining an operating state of a photovoltaic array according to an exemplary embodiment of the present disclosure. The apparatus may be implemented as all or part of a computer device through software, hardware or a combination thereof. The apparatus may include:

a first acquiring module 1001, configured to acquire present output current values of photovoltaic strings included in a photovoltaic array, wherein the photovoltaic array includes at least two photovoltaic strings in parallel;

a first determining module 1002, configured to determine a target abnormality score predicting model based on the present output current values, wherein different abnormality score predicting models correspond to different characteristic current value ranges, and the abnormality score predicting model is obtained by training based on a historical output current value of the photovoltaic array;

a second determining module 1003, configured to determine a present abnormality score corresponding to the photovoltaic array by inputting the present output current values into the target abnormality score predicting model; and a third determining module 1004, configured to determine an operating state of the photovoltaic array by comparing the present abnormality score with a target abnormality score, wherein different abnormality score predicting models correspond to different abnormality scores, and the abnormality score is obtained after inputting the historical output current value into the abnormality score predicting model.

Optionally, the third determining module 1004 includes:

a first determining unit, configured to determine that the operating state of the photovoltaic array is normal in response to the present abnormality score being less than or equal to the target abnormality score;

an acquiring unit, configured to acquire present abnormality scores corresponding to N continuous sampling moments in response to the present abnormality score being greater than the target abnormality score, wherein N is an integer greater than or equal to 1; and a second determining unit, configured to determine that the operating state of the photovoltaic array is abnormal in response to present abnormality scores corresponding to at least M continuous sampling moments being greater than the target abnormality score, wherein M is an integer greater than or equal to 1, and M is less than or equal to N.

Optionally, the apparatus further includes:

a fourth determining module, configured to determine a minimum output current value of the present output current values corresponding to the M continuous sampling moments; and a fifth determining module, configured to determine a photovoltaic string corresponding to the minimum output current value as an abnormal photovoltaic string.

Optionally, the first determining module 1002 includes:

a third determining unit, configured to obtain filtered present output current values by filtering the present output current values based on a current threshold, wherein the current threshold is determined by historical operating state data of the photovoltaic array, the historical operating state data includes a historical output current value of the photovoltaic string, a historical irradiance corresponding to the photovoltaic string, a historical ambient temperature and a historical wind speed of an environment where the photovoltaic string is located, and the filtered present output current values are less than or equal to the current threshold;

a fourth determining unit, configured to determine a K percentile in the filtered present output current values as a present characteristic current value, wherein K is an integer greater than or equal to 50, and the present characteristic current value characterizes present current characteristics corresponding to the photovoltaic array at a present acquisition moment; and a fifth determining unit, configured to determine the target abnormality score predicting model based on the present characteristic current value, wherein the present characteristic current value lies within a target characteristic current value range corresponding to the target abnormality score predicting model.

Optionally, the apparatus further includes:

a second acquiring module, configured to acquire the historical operating state data of the photovoltaic array within a preset time period;

a first calculating module, configured to calculate a photovoltaic module temperature corresponding to the photovoltaic array based on a maximum irradiance, a maximum wind speed and a maximum ambient temperature, wherein the maximum irradiance is determined by the historical irradiances, the maximum ambient temperature is determined by the historical ambient temperatures, and the maximum wind speed is determined by the historical wind speeds;

a second calculating module, configured to calculate a first maximum output current value corresponding to the photovoltaic array based on the photovoltaic module temperature and the maximum irradiance, wherein the first maximum output current value is an output current value of the photovoltaic string under the maximum irradiance;

a third calculating module, configured to calculate a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input; and a sixth determining module, configured to determine a minimum value of the first maximum output current value and the second maximum output current value as the current threshold.

Optionally, the apparatus further includes:

a seventh determining module, configured to obtain filtered historical output current values by filtering the historical output current values based on the current threshold, wherein the filtered historical output current values are less than or equal to the current threshold;

an eighth determining module, configured to determine a historical characteristic current value based on the filtered historical output current values, wherein the historical characteristic current value characterizes historical current characteristics corresponding to each acquisition moment of the photovoltaic array;

a ninth determining module, configured to determine at least one training sample by dividing the filtered historical output current values based on the historical characteristic current value, wherein the historical output current values included in different training samples correspond to different characteristic current value ranges, and the characteristic current value range is determined based on the historical characteristic current value; and a training module, configured to train the abnormality score predicting model based on the training sample.

Optionally, the abnormality score predicting model adopts an Isolation Forest algorithm, and the abnormality score predicting model includes S binary trees, wherein S is an integer greater than or equal to 1.

Optionally, the apparatus further includes:

a tenth determining module, configured to obtain S path lengths corresponding to the training sample by inputting the training sample into the S binary trees respectively; and a fourth calculating module, configured to calculate an abnormality score corresponding to the training sample based on the S path lengths.

In the embodiments of the present disclosure, present output current values of photovoltaic strings included in a photovoltaic array are acquired, a target abnormality score predicting model is determined based on the present output current values, a present abnormality score corresponding to the photovoltaic array is output by inputting the present output current values into the target abnormality score predicting model, so as to compare the present abnormality score with a target abnormality score corresponding to the target abnormality score predicting model, and thus an operating state of the photovoltaic array is determined based on the comparison result. The present abnormality score is output by inputting the present output current values acquired in real-time into the abnormality score predicting model, so as to determine the present operating state of the photovoltaic array. Since the present output current value can reflect the operating state of the photovoltaic array in real-time, compared to a method for determining an operating state through an infrared image in the related arts, the interference of the ambient temperature on the infrared image can be avoided, thereby improving the accuracy of determining the operating state of the photovoltaic array.

Figure 11:
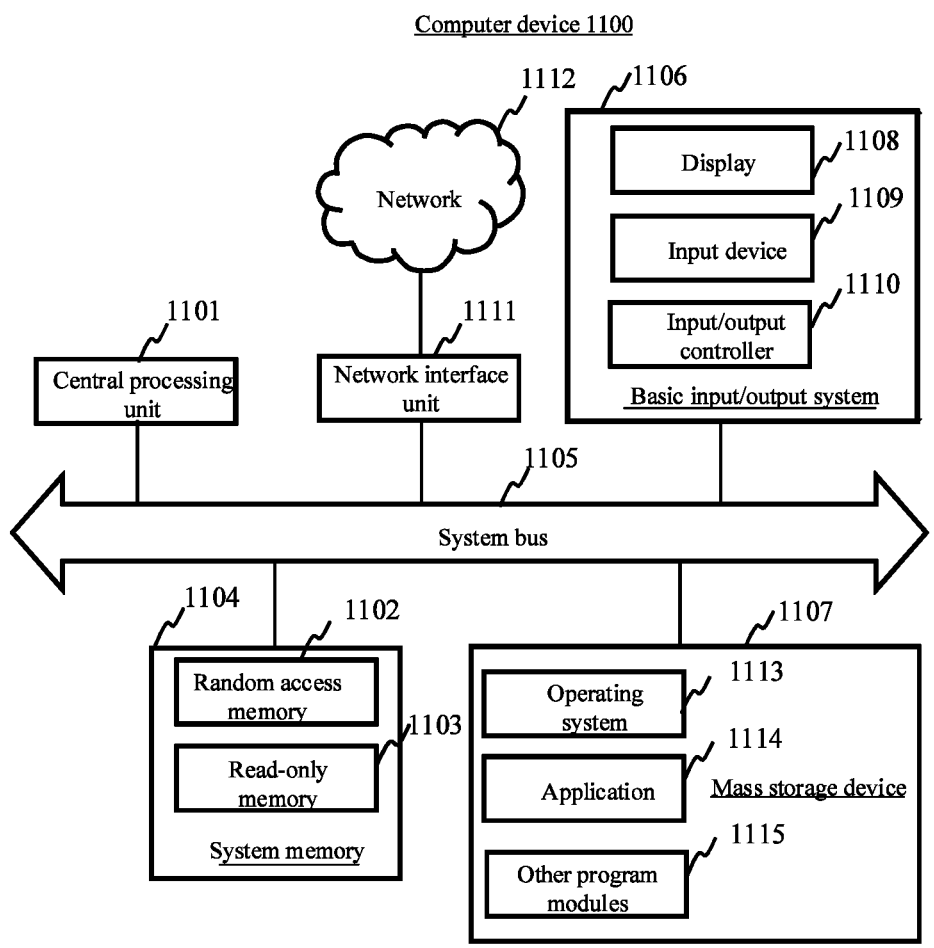
FIG. 11 shows a schematic structural diagram of a computer device according to an exemplary embodiment of the present disclosure.

Refer to FIG. 11, which shows a schematic structural diagram of a computer device according to an exemplary embodiment of the present disclosure. Specifically, the computer device 1100 includes a central processing unit (CPU) 1101, a system memory 1104 including a random access memory (RAM) 1102 and a read-only memory (ROM) 1103, and a system bus 1105 that connects the system memory 1104 and the central processing unit 1101. The computer device 1100 also includes a basic input/output (I/O) system 1106 that facilitates transmission of information between various components within the computer device, and a mass storage device 1107 for storing an operating system 1113, an application 1114, and other program modules 1115.

The basic input/output system 1106 includes a display 1108 for displaying information and an input device 1109 such as a mouse or a keyboard for user input of information. The display 1108 and the input device 1109 are both connected to the central processing unit 1101 via an input/output controller 1110 connected to the system bus 1105. The basic input/output system 1106 may further include the input/output controller 1110 for receiving and processing input from a plurality of other devices, such as a keyboard, a mouse, or an electronic stylus. Similarly, the input/output controller 1110 also provides output to a display screen, a printer, or other types of output devices.

The mass storage device 1107 is connected to the central processing unit 1101 by a mass storage controller (not shown) connected to the system bus 1105. The mass storage device 1107 and its associated computer-readable storage medium provide non-volatile storage for the computer device 1100. That is, the mass storage device 1107 may include a computer-readable storage medium (not shown) such as a hard disk or a compact disc read-only memory (CD-ROM) drive.

Without loss of generality, the computer-readable storage medium may include a computer storage medium and a communication medium. The computer storage medium includes volatile and nonvolatile, removable and non-removable medium implemented by any method or technology for storage of information such as computer-readable storage instructions, data structures, program modules, or other data. The computer storage medium includes an RAM, an ROM, an erasable programmable read-only memory (EPROM), an electrically erasable programmable read-only memory (EEPROM), a flash memory, or other solid state storage technologies, a CD-ROM, a digital versatile disk (DVD) or other optical storage, a tape cassette, a magnetic tape, a magnetic disk storage or other magnetic storage devices. Of course, those skilled in the art may know that the computer storage medium is not limited to the above. The system memory 1104 and the mass storage device 1107 described above may be collectively referred to as a memory.

The memory stores one or more programs configured to be run by one or more central processing units 1101 and to include instructions for performing the above-mentioned method embodiments. The one or more programs, when executed by the central processing unit 1101, cause the central processing unit 1101 to perform the method according to the above method embodiments.

According to various embodiments of the present disclosure, the computer device 1100 may also be operated by being connected via a network such as the Internet to a remote network computer. That is, the computer device 1100 may be connected to a network 1112 by a network interface unit 1111 connected to the system bus 1105, or that is, the computer device 1110 may be connected to other types of networks or remote server systems (not shown) by using the network interface unit 1111.

The memory further includes one or more programs. The one or more programs stored in the memory include instructions configured to perform the steps performed by the computer device in the method according to the embodiments of the present disclosure.

A computer-readable storage medium is further provided by an embodiment of the present disclosure. The computer-readable storage medium stores at least one instruction therein. The at least one instruction, when loaded and executed by a processor, causes the processor to perform the method for determining the operating state of the photovoltaic array described in the above embodiments.

A computer program product is further provided by an embodiment of the present disclosure. The computer program product stores at least one instruction therein. The at least one instruction, when loaded and executed by a processor, causes the processor to perform the method for determining the operating state of the photovoltaic array described in the above embodiments.

Those skilled in the art may be aware that, in one or more of the foregoing examples, the functions described in the embodiments of the present disclosure may be implemented by hardware, software, firmware, or any combination thereof. When implemented by software, these functions may be stored in a computer-readable storage medium or transmitted as one or more instructions or codes on the computer-readable storage medium. The computer-readable storage medium includes a computer storage medium and a communication medium. The communication medium includes any medium that facilitates the transmission of a computer program from one place to another. The storage medium may be any available medium that may be accessed by a general-purpose or special-purpose computer.

The above are merely optional embodiments of the present disclosure, but are not intended to limit the present disclosure. Any modifications, equivalent replacements and improvements made within the spirits and principles of the present disclosure shall all fall in the protection scope of the present disclosure.

What is claimed is:

1. A method for determining an operating state of a photovoltaic array, comprising:
   acquiring present output current values of photovoltaic strings comprised in the photovoltaic array, wherein the photovoltaic array comprises at least two photovoltaic strings in parallel;
   determining a target abnormality score predicting model based on the present output current values, wherein different target abnormality score predicting models correspond to different characteristic current value ranges, and the target abnormality score predicting model is obtained by training based on a historical output current value of the photovoltaic array;
   determining a present abnormality score corresponding to the photovoltaic array by inputting the present output current values into the target abnormality score predicting model; and
   determining the operating state of the photovoltaic array by comparing the present abnormality score with a target abnormality score, wherein different abnormality score predicting models correspond to different target abnormality scores, and the target abnormality score is obtained after inputting the historical output current value into the target abnormality score predicting model.

2. The method according to claim 1, wherein determining the operating state of the photovoltaic array by comparing the present abnormality score with the target abnormality score comprises:
   determining that the operating state of the photovoltaic array is normal in response to the present abnormality score being less than or equal to the target abnormality score;
   acquiring present abnormality scores corresponding to N continuous sampling moments in response to the present abnormality score being greater than the target abnormality score, wherein N is an integer greater than or equal to 1; and
   determining that the operating state of the photovoltaic array is abnormal in response to present abnormality scores corresponding to at least M continuous sampling moments being greater than the target abnormality score, wherein M is an integer greater than or equal to 1, and M is less than or equal to N.

3. The method according to claim 2, wherein after determining that the operating state of the photovoltaic array is abnormal, the method further comprises:
   determining a minimum output current value of the present output current values corresponding to the M continuous sampling moments; and
   determining a photovoltaic string corresponding to the minimum output current value as an abnormal photovoltaic string.

4. The method according to claim 1, wherein determining the target abnormality score predicting model based on the present output current values comprises:
   obtaining filtered present output current values by filtering the present output current values based on a current threshold, wherein the current threshold is determined based on historical operating state data of the photovoltaic array, the historical operating state data comprising a historical output current value of the photovoltaic string, a historical irradiance corresponding to the photovoltaic string, a historical ambient temperature, and a historical wind speed of environment where the photovoltaic string is located, and the filtered present output current values are less than or equal to the current threshold;
   determining a K percentile in the filtered present output current values as a present characteristic current value, wherein K is an integer greater than or equal to 50, and the present characteristic current value characterizes present current characteristics corresponding to the photovoltaic array at a present acquisition moment; and
   determining the target abnormality score predicting model based on the present characteristic current value, wherein the present characteristic current value is within a target characteristic current value range corresponding to the target abnormality score predicting model.

5. The method according to claim 4, wherein before acquiring the present output current values of the photovoltaic strings comprised in the photovoltaic array, the method further comprises:
   acquiring the historical operating state data of the photovoltaic array within a preset time period;
   calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input; and determining a minimum value of the first maximum output current value and the second maximum output current value as the current threshold.

6. The method according to claim 4, further comprising:
acquiring filtered historical output current values by filtering the historical output current values based on the current threshold, wherein the filtered historical output current values are less than or equal to the current threshold;

determining a historical characteristic current value based on the filtered historical output current values, wherein the historical characteristic current value characterizes historical current characteristics corresponding to the photovoltaic array at each acquisition moment;

determining at least one training sample by dividing the filtered historical output current values based on the historical characteristic current value, wherein the historical output current values comprised in different training samples correspond to different characteristic current value ranges, and the characteristic current value ranges are determined based on the historical characteristic current value; and training the target abnormality score predicting model based on the at least one training sample.

7. The method according to claim 6, wherein the target abnormality score predicting model adopts an Isolation Forest algorithm, and the target abnormality score predicting model comprises S binary trees, wherein S is an integer greater than or equal to 1; and after training the target abnormality score predicting model based on the training sample, the method further comprises:
acquiring S path lengths corresponding to the training sample by inputting the training sample into the S binary trees; and
calculating an abnormality score corresponding to the training sample based on the S path lengths.

8. An apparatus for determining an operating state of a photovoltaic array, comprising:
a first acquiring module, configured to acquire present output current values of photovoltaic strings comprised in a photovoltaic array, wherein the photovoltaic array comprises at least two photovoltaic strings in parallel;

a first determining module, configured to determine a target abnormality score predicting model based on the present output current values, wherein different target abnormality score predicting models correspond to different characteristic current value ranges, and the target abnormality score predicting model is obtained by training based on a historical output current value of the photovoltaic array;

a second determining module, configured to determine a present abnormality score corresponding to the photovoltaic array by inputting the present output current values into the target abnormality score predicting model; and a third determining module, configured to determine the operating state of the photovoltaic array by comparing the present abnormality score with a target abnormality score, wherein different target abnormality score predicting models correspond to different target abnormality scores, and the abnormality score is obtained by inputting the historical output current value into the target abnormality score predicting model.

9. A computer device, comprising:
a processor; and
a memory storing at least one instruction, at least one program, a code set or an instruction set therein, wherein the at least one instruction, the at least one program, the code set or the instruction set, when loaded and executed by the processor, causes the processor to perform a method comprising:
acquiring present output current values of photovoltaic strings comprised in the photovoltaic array, wherein the photovoltaic array comprises at least two photovoltaic strings in parallel;

determining a target abnormality score predicting model based on the present output current values, wherein different target abnormality score predicting models correspond to different characteristic current value ranges, and the target abnormality score predicting model is obtained by training based on a historical output current value of the photovoltaic array;

determining a present abnormality score corresponding to the photovoltaic array by inputting the present output current values into the target abnormality score predicting model; and determining the operating state of the photovoltaic array by comparing the present abnormality score with a target abnormality score, wherein different target abnormality score predicting models correspond to different target abnormality scores, and the target abnormality score is obtained after inputting the historical output current value into the target abnormality score predicting model.

10. A computer-readable storage medium, storing at least one instruction, at least one program, a code set or an instruction set therein, wherein the at least one instruction, the at least one program, the code set or the instruction set, when loaded and executed by a processor, causes the processor to perform a method comprising:
acquiring present output current values of photovoltaic strings comprised in the photovoltaic array, wherein the photovoltaic array comprises at least two photovoltaic strings in parallel;

determining a target abnormality score predicting model based on the present output current values, wherein different target abnormality score predicting models correspond to different characteristic current value ranges, and the target abnormality score predicting model is obtained by training based on a historical output current value of the photovoltaic array;

determining a present abnormality score corresponding to the photovoltaic array by inputting the present output current values into the target abnormality score predicting model; and determining the operating state of the photovoltaic array by comparing the present abnormality score with a target abnormality score, wherein different target abnormality score predicting models correspond to different target abnormality scores, and the target abnormality score is obtained after inputting the historical output current value into the target abnormality score predicting model.

11. The computer device according to claim 9, wherein determining the operating state of the photovoltaic array by comparing the present abnormality score with the target abnormality score comprises:
　determining that the operating state of the photovoltaic array is normal in response to the present abnormality score being less than or equal to the target abnormality score;
　acquiring present abnormality scores corresponding to N continuous sampling moments in response to the present abnormality score being greater than the target abnormality score, wherein N is an integer greater than or equal to 1; and
　determining that the operating state of the photovoltaic array is abnormal in response to present abnormality scores corresponding to at least M continuous sampling moments being greater than the target abnormality score, wherein M is an integer greater than or equal to 1, and M is less than or equal to N.

12. The computer device according to claim 11, wherein after determining that the operating state of the photovoltaic array is abnormal, the method further comprises:
　determining a minimum output current value of the present output current values corresponding to the M continuous sampling moments; and
　determining a photovoltaic string corresponding to the minimum output current value as an abnormal photovoltaic string.

13. The computer device according to claim 9, wherein determining the target abnormality score predicting model based on the present output current values comprises:
　obtaining filtered present output current values by filtering the present output current values based on a current threshold, wherein the current threshold is determined based on historical operating state data of the photovoltaic array, the historical operating state data comprising a historical output current value of the photovoltaic string, a historical irradiance corresponding to the photovoltaic string, a historical ambient temperature, and a historical wind speed of environment where the photovoltaic string is located, and the filtered present output current values are less than or equal to the current threshold;
　determining a K percentile in the filtered present output current values as a present characteristic current value, wherein K is an integer greater than or equal to 50, and the present characteristic current value characterizes present current characteristics corresponding to the photovoltaic array at a present acquisition moment; and
　determining the target abnormality score predicting model based on the present characteristic current value, wherein the present characteristic current value is within a target characteristic current value range corresponding to the target abnormality score predicting model.

14. The computer device according to claim 13, wherein before acquiring the present output current values of the photovoltaic strings comprised in the photovoltaic array, the method further comprises:
　acquiring the historical operating state data of the photovoltaic array within a preset time period;
　calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;
　calculating a first maximum output current value corresponding to the photovoltaic array based on the photovoltaic module temperature and the maximum irradiance, wherein the first maximum output current value is an output current value of the photovoltaic string under the maximum irradiance;
　calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input; and
　determining a minimum value of the first maximum output current value and the second maximum output current value as the current threshold.

15. The computer device according to claim 13, further comprising:
　acquiring filtered historical output current values by filtering the historical output current values based on the current threshold, wherein the filtered historical output current values are less than or equal to the current threshold;
　determining a historical characteristic current value based on the filtered historical output current values, wherein the historical characteristic current value characterizes historical current characteristics corresponding to the photovoltaic array at each acquisition moment;
　determining at least one training sample by dividing the filtered historical output current values based on the historical characteristic current value, wherein the historical output current values comprised in different training samples correspond to different characteristic current value ranges, and the characteristic current value ranges are determined based on the historical characteristic current value; and
　training the target abnormality score predicting model based on the at least one training sample.

16. The computer device according to claim 15, wherein the target abnormality score predicting model adopts an Isolation Forest algorithm, and the target abnormality score predicting model comprises S binary trees, wherein S is an integer greater than or equal to 1; and
　after training the target abnormality score predicting model based on the training sample, the method further comprises:
　　acquiring S path lengths corresponding to the training sample by inputting the training sample into the S binary trees; and
　　calculating an abnormality score corresponding to the training sample based on the S path lengths.

17. The computer-readable storage medium according to claim 10, wherein determining the operating state of the photovoltaic array by comparing the present abnormality score with the target abnormality score comprises:

determining that the operating state of the photovoltaic array is normal in response to the present abnormality score being less than or equal to the target abnormality score;

acquiring present abnormality scores corresponding to N continuous sampling moments in response to the present abnormality score being greater than the target abnormality score, wherein N is an integer greater than or equal to 1; and determining that the operating state of the photovoltaic array is abnormal in response to present abnormality scores corresponding to at least M continuous sampling moments being greater than the target abnormality score, wherein M is an integer greater than or equal to 1, and M is less than or equal to N.

18. The computer-readable storage medium according to claim 17, wherein after determining that the operating state of the photovoltaic array is abnormal, the method further comprises:

determining a minimum output current value of the present output current values corresponding to the M continuous sampling moments; and determining a photovoltaic string corresponding to the minimum output current value as an abnormal photovoltaic string.

19. The computer-readable storage medium according to claim 10, wherein determining the target abnormality score predicting model based on the present output current values comprises:

obtaining filtered present output current values by filtering the present output current values based on a current threshold, wherein the current threshold is determined based on historical operating state data of the photovoltaic array, the historical operating state data comprising a historical output current value of the photovoltaic string, a historical irradiance corresponding to the photovoltaic string, a historical ambient temperature, and a historical wind speed of environment where the photovoltaic string is located, and the filtered present output current values are less than or equal to the current threshold;

determining a K percentile in the filtered present output current values as a present characteristic current value, wherein K is an integer greater than or equal to 50, and the present characteristic current value characterizes present current characteristics corresponding to the photovoltaic array at a present acquisition moment; and determining the target abnormality score predicting model based on the present characteristic current value, wherein the present characteristic current value is within a target characteristic current value range corresponding to the target abnormality score predicting model.

20. The computer-readable storage medium according to claim 19, wherein before acquiring the present output current values of the photovoltaic strings comprised in the photovoltaic array, the method further comprises:

acquiring the historical operating state data of the photovoltaic array within a preset time period;

calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input; and determining a minimum value of the first maximum output current value and the second maximum output current value as the current threshold.

21. The computer-readable storage medium according to claim 19, further comprising:

acquiring filtered historical output current values by filtering the historical output current values based on the current threshold, wherein the filtered historical output current values are less than or equal to the current threshold;

determining a historical characteristic current value based on the filtered historical output current values, wherein the historical characteristic current value characterizes historical current characteristics corresponding to the photovoltaic array at each acquisition moment;

determining at least one training sample by dividing the filtered historical output current values based on the historical characteristic current value, wherein the historical output current values comprised in different training samples correspond to different characteristic current value ranges, and the characteristic current value ranges are determined based on the historical characteristic current value; and training the target abnormality score predicting model based on the at least one training sample.

22. The computer-readable storage medium according to claim 21, wherein the target abnormality score predicting model adopts an Isolation Forest algorithm, and the target abnormality score predicting model comprises S binary trees, wherein S is an integer greater than or equal to 1; and after training the target abnormality score predicting model based on the training sample, the method further comprises:

acquiring S path lengths corresponding to the training sample by inputting the training sample into the S binary trees; and calculating an abnormality score corresponding to the training sample based on the S path lengths.

* * * * *